United States Patent
Yamamoto

(10) Patent No.: US 9,118,853 B2
(45) Date of Patent: Aug. 25, 2015

(54) IMAGE PICKUP APPARATUS

(75) Inventor: Akira Yamamoto, Yokohama (JP)

(73) Assignee: CANON KABUSHIKI KAISHA (JP)

( * ) Notice: Subject to any disclaimer, the term of this patent is extended or adjusted under 35 U.S.C. 154(b) by 0 days.

(21) Appl. No.: 13/502,225

(22) PCT Filed: Apr. 12, 2011

(86) PCT No.: PCT/JP2011/059477
§ 371 (c)(1),
(2), (4) Date: Apr. 16, 2012

(87) PCT Pub. No.: WO2011/129459
PCT Pub. Date: Oct. 20, 2011

(65) Prior Publication Data
US 2012/0206626 A1    Aug. 16, 2012

(30) Foreign Application Priority Data

Apr. 16, 2010   (JP) .................... 2010-094941

(51) Int. Cl.
*H04N 5/225* (2006.01)
*H04N 5/228* (2006.01)
(Continued)

(52) U.S. Cl.
CPC .............. *H04N 5/3572* (2013.01); *G02B 7/102* (2013.01); *G02B 27/0068* (2013.01)

(58) Field of Classification Search
CPC ............ H04N 5/23296; H04N 5/2254; H04N 5/23212; G06T 5/002; G06T 5/001
USPC ............... 340/240.99, 240.1, 240.3; 348/335, 348/340, 240.99, 240.1, 222.1; 382/275
See application file for complete search history.

(56) References Cited

U.S. PATENT DOCUMENTS 6,320,979 B1   11/2001  Melen
6,421,185 B1    7/2002  Wick et al.
(Continued)

FOREIGN PATENT DOCUMENTS

CN    101086552 A   12/2007
CN    100492064 C    5/2009
(Continued)

OTHER PUBLICATIONS

International Preliminary Report on Patentability issued Oct. 26, 2012 for parent PCT/JP2011/059477.
(Continued)

*Primary Examiner* — Sinh Tran
*Assistant Examiner* — Xi Wang
(74) *Attorney, Agent, or Firm* — Rossi, Kimms & McDowell LLP

(57) ABSTRACT

An image pickup apparatus including: an image pickup element; an image pickup optical system for forming an image of an object by using a beam; a phase modulating element disposed on a pupil plane, for modulating a phase state of the beam; a modulating element controller for controlling the phase modulating element; and an image pickup element controller for dividing the image pickup element into multiple areas, and reading, for each of the multiple divided areas, information on the image in a time-sharing manner, in which, when the image pickup element controller reads the information on the image formed on the image pickup element by an area-by-area basis for the multiple divided areas in the time-sharing manner, the modulating element controller controls the phase modulating element so as to reduce a wavefront aberration in the divided area from which the information is to be read.

12 Claims, 32 Drawing Sheets

(51) Int. Cl.
*H04N 5/262* (2006.01)
*G06K 9/40* (2006.01)
*H04N 5/357* (2011.01)
*G02B 7/10* (2006.01)
*G02B 27/00* (2006.01)

(56) References Cited

U.S. PATENT DOCUMENTS

| | | |
|---|---|---|
| 6,473,241 B1 | 10/2002 | Wick et al. |
| 6,909,686 B2 | 6/2005 | Iwasaki et al. |
| 6,911,638 B2 * | 6/2005 | Dowski et al. ............. 250/201.9 |
| 7,782,386 B2 | 8/2010 | Nishioka et al. |
| 2003/0071906 A1 * | 4/2003 | Matsumoto ................... 348/241 |
| 2004/0021953 A1 * | 2/2004 | Betensky et al. ............. 359/691 |
| 2004/0109236 A1 | 6/2004 | Nishioka |
| 2004/0130632 A1 * | 7/2004 | Shiraishi .................... 348/223.1 |
| 2005/0141047 A1 * | 6/2005 | Watanabe ..................... 358/471 |
| 2005/0190434 A1 * | 9/2005 | Betensky et al. ............. 359/356 |
| 2005/0200817 A1 * | 9/2005 | Kim et al. ....................... 353/97 |
| 2007/0041102 A1 * | 2/2007 | Kuo ................................ 359/680 |
| 2007/0053072 A1 * | 3/2007 | Nanba ............................ 359/689 |
| 2007/0146531 A1 * | 6/2007 | Toshikiyo ..................... 348/340 |
| 2007/0285802 A1 | 12/2007 | Sugita |
| 2008/0239099 A1 * | 10/2008 | Abe .......................... 348/231.99 |
| 2009/0092284 A1 * | 4/2009 | Breed et al. ................... 382/103 |
| 2010/0110233 A1 * | 5/2010 | Ohara et al. ................ 348/240.3 |
| 2012/0099005 A1 * | 4/2012 | Kali et al. ................ 348/240.99 |

FOREIGN PATENT DOCUMENTS

| | | |
|---|---|---|
| JP | S49-094325 | 9/1974 |
| JP | 61137124 A | 6/1986 |
| JP | 11194274 A | 7/1999 |
| JP | 2001249315 A | 9/2001 |
| JP | 2004004496 A | 1/2004 |
| JP | 2008268937 A | 11/2008 |
| JP | 2009278486 A | 11/2009 |

OTHER PUBLICATIONS

International Search Report (ISR) issued May 31, 2011 for parent PCT/JP2011/059477.
Noboyuki Hashimoto; "Liquid-Crystal Active Optics and Their Applications"; Japanese Journal of Optics, vol. 36, No. 3, 2007; pp. 149-153; English Abstract provided.
Martinez, et al.; Foveated, wide field-of-view imaging system using liquid crystal spatial light modulator; Optics Express; vol. 8., No. 10, May 7, 2001; pp. 555-560.
Extended European Search Report for EP 11768977.8, dated Dec. 2, 2013.
Chinese Office Action issued in Chinese counterpart application No. CN201180018990.6, dated Mar. 2, 2015. English translation provided.

* cited by examiner

AREA a
LEFT: BEFORE MODULATING
RIGHT: AFTER MODULATING

AREA b
LEFT: BEFORE MODULATING
RIGHT: AFTER MODULATING

AREA c
LEFT: BEFORE MODULATING
RIGHT: AFTER MODULATING

AREA d
LEFT: BEFORE MODULATING
RIGHT: AFTER MODULATING

| i1 | f1 | e2 | f2 | i2 | ~102 |
|----|----|----|----|----|------|
| h1 | d1 | b1 | d2 | h2 | |
| g1 | c1 | a  | c2 | g2 | |
| h3 | d3 | b2 | d4 | h4 | |
| i3 | f3 | e1 | f4 | i4 | |

BEFORE MODULATING      AFTER MODULATING

S1 ▨ -2.0-0.0λ
S2 ■ 0.0-2.0λ
S3 □ 2.0-4.0λ
S4 ■ 4.0-6.0λ
S5 ■ 6.0-8.0λ

S1 ▨ −0.5−0.0λ
S2 ■ 0.0−0.5λ
S3 □ 0.5−1.0λ

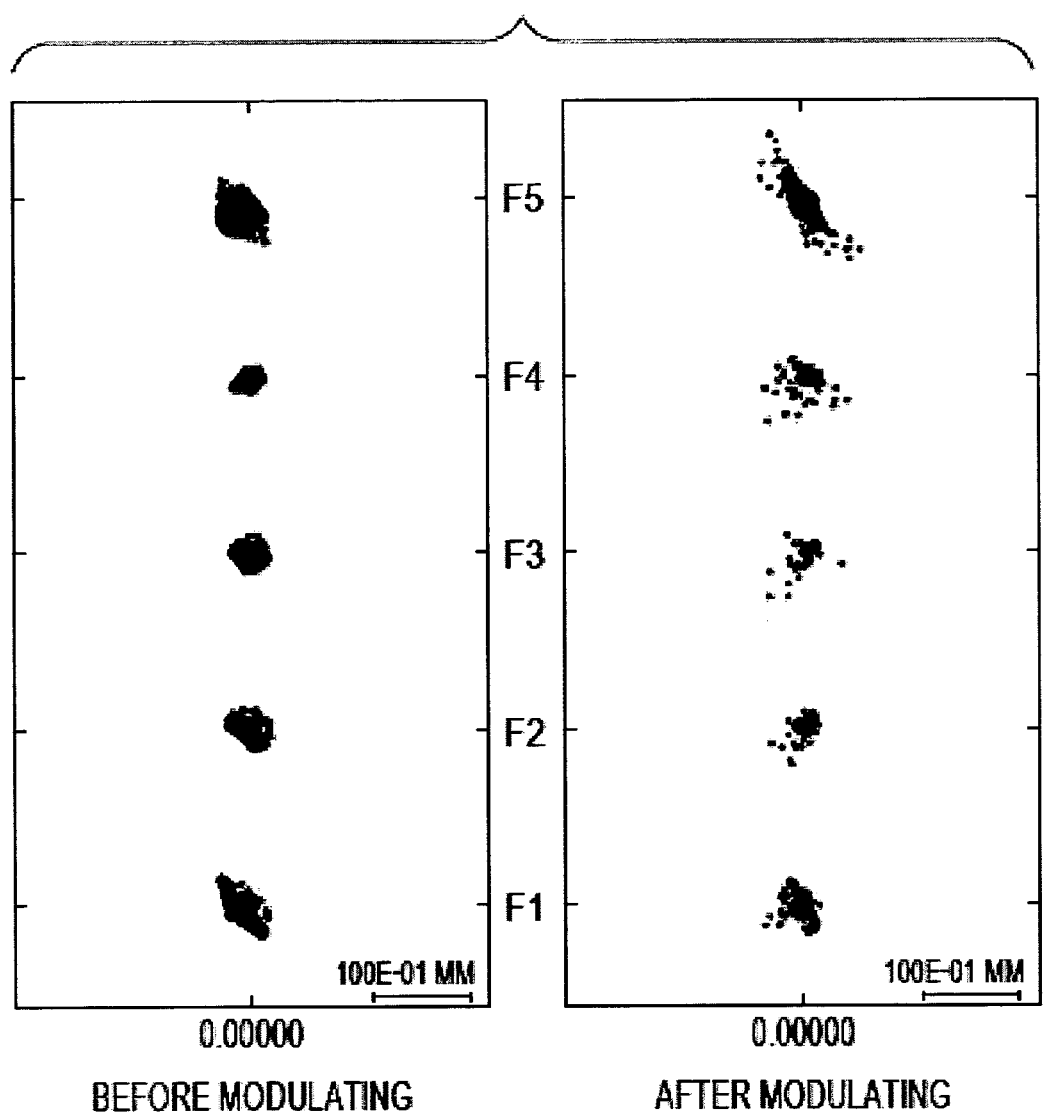

BEFORE MODULATING   AFTER MODULATING

S1 ■ -1.5--1.0λ
S2 ▦ -1.0--0.5λ
S3 □ -0.5-0.0λ

BEFORE MODULATING　　　AFTER MODULATING

S1 ■ -1.5--1.0λ
S2 □ -1.0--0.5λ
S3 ■ -0.5-0.0λ
S4 ▦ 0.0-0.5λ

S1 ▨ 0.00–0.05λ
S2 ■ 0.05–0.10λ

IMAGE PICKUP APPARATUS

This application is a U.S. National Phase Application of PCT International Application PCT/JP2011/059477 filed on Apr. 12, 2011 which is based on and claims priority from JP 2010-094941 filed on Apr. 16, 2010 the contents of which is incorporated herein in its entirety by reference.

TECHNICAL FIELD

The present invention relates to an image pickup apparatus, and is suitable for a digital still camera, a video camera, a TV camera and the like, which are provided, on an optical path of an image pickup optical system thereof, with such a correction unit, for example a phase modulating element, for effectively correcting aberration in the image pickup optical system.

BACKGROUND ART

In order to correct aberrations in image pickup optical systems, there are used various methods. For example, in an image pickup optical system having a wide angle of field, an aspherical lens is used to perform aberration correction with respect to a beam having a large angle of field. As the image pickup angle of field becomes larger (as the angle of field becomes wider), there occur more frequently coma, field curvature/astigmatism and the like. Thus, in order to correct those aberrations, the number of lenses is increased, and aspherical lenses are used.

Optical elements (lenses) used in an image pickup optical system are unchangeable in shape. For this reason, even if the surface of a lens has a curvature or an aspherical shape optimal for a given angle of field (zoom position) or a focus position, this shape is not necessarily optimal for another angle of field (zoom position) or another focus position.

To address this, there is conventionally known an image pickup apparatus in which aberration correction is performed with an effect similar to the effect obtained when the curvature and the aspherical coefficient are dynamically changed, by interposing a reflective phase modulating element in the optical system and performing optimal wavefront modulation according to each zoom position, focus position or the like (PTL 1). Further, there is known a pickup apparatus for an optical disc in which aberration generated due to a thickness error, a tilt or the like of the optical disc is corrected by using a liquid crystal element (PTL 2).

In general, all aberrations in an optical system can be expressed as a pupil aberration at a pupil of the optical system. Accordingly, there is known an imaging optical system in which a phase modulating element is interposed at the pupil of the optical system to correct the spherical aberration, and conversely add the spherical aberration to obtain a soft-focus effect (PTL 3).

Further, as for the method in which the shape of the reflective phase modulating element is changed in synchronization with the zoom position or the focus position to correct aberration in an image pickup optical system, as the angle of field becomes wider, the aberration correction for the entire screen becomes more difficult with only a single aspherical shape. For this reason, this method tends to leave many residual aberrations.

CITATION LIST

Patent Literature

PTL 1: U.S. Pat. No. 7,782,386
PTL 2: U.S. Pat. No. 6,909,686
PTL 3: Japanese Patent Application Laid-Open No. S61-137124
PTL 4: Japanese Patent Application Laid-Open No. S49-094325
PTL 5: Japanese Patent Application Laid-Open No. H11-194274

Non Patent Literature

NPL 1: Japanese Journal of Optics, Vol. 36, No. 3, 2007

SUMMARY OF INVENTION

Technical Problem

The present invention has an object to provide an image pickup apparatus which favorably corrects aberration with respect to both an axial beam and an off-axial beam having a certain angle of field, and thus achieves high optical performance over an entire screen.

Solution to Problem

In order to achieve the above-mentioned object, there is provided an image pickup apparatus including: an image pickup element; an image pickup optical system for forming an image of an object on the image pickup element by using a beam from the object; a phase modulating element disposed on a pupil plane of the image pickup optical system, for modulating a phase state of the beam from the object; a modulating element controller for controlling the phase modulating element; and an image pickup element controller for dividing the image pickup element into multiple areas, and reading, for each of the multiple divided areas, information on the image formed on the image pickup element in a time-sharing manner, in which, when the image pickup element controller reads the information on the image formed on the image pickup element by an area-by-area basis for the multiple divided areas in the time-sharing manner, the modulating element controller controls the phase modulating element so as to reduce a wavefront aberration in the divided area from which the information is to be read.

Advantageous Effects of Invention

According to the present invention, the image pickup element is divided into the multiple areas, and the correction of the wavefront aberration with respect to respective angles of field corresponding to the multiple divided areas is performed at the pupil of the image pickup optical system. As a result, there can be obtained the image pickup apparatus which performs the aberration correction most efficiently with respect to the respective angles of field, and thus has high optical performance.

Further features of the present invention will become apparent from the following description of exemplary embodiments with reference to the attached drawings.

BRIEF DESCRIPTION OF DRAWINGS

FIG. 20 is a diagram illustrating spots of an area i1 (wide side) obtained before and after the phase modulating element performs the modulation according to the third embodiment.

DESCRIPTION OF EMBODIMENTS

Figure 1:
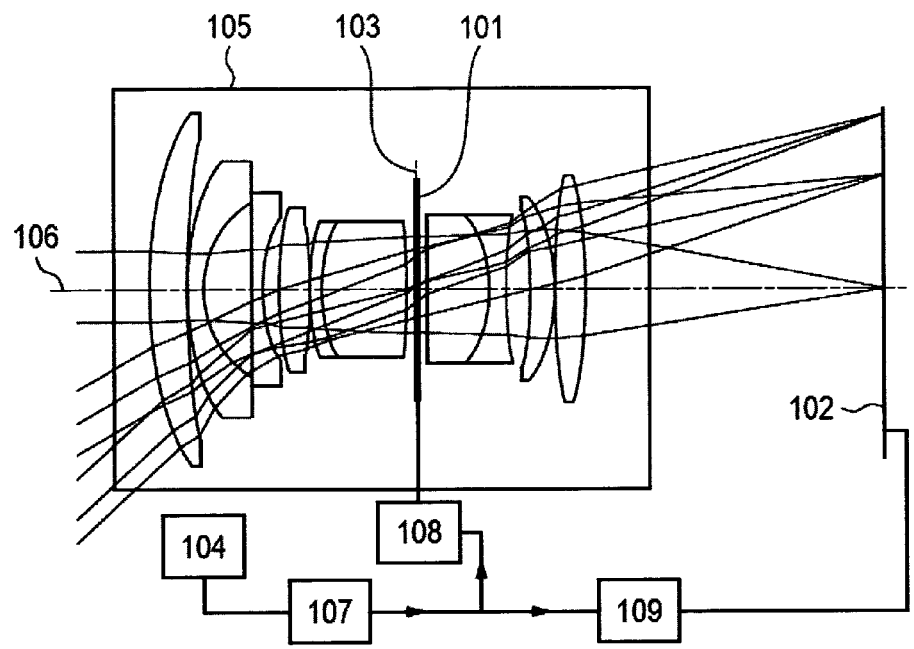
FIG. 1 is an explanatory diagram of a first embodiment of the present invention.

The present invention has an object to provide an image pickup apparatus which favorably corrects aberration with respect to both an axial beam and an off-axial beam having a certain angle of field, and thus achieves high optical performance over an entire screen. Hereinafter, the image pickup apparatus of the present invention is described. The image pickup apparatus of the present invention uses an image pickup optical system 105 having a single focal length or a zoom function to form image information of an external world (object) on a CCD or CMOS image pickup element 102. On a plane of a pupil 103 (pupil plane) of the image pickup optical system 105 or its vicinity, there is disposed a phase modulating element 101 which modulates the state of phase of an incident wavefront and emits the resultant beams. Here, the pupil plane is such a surface that is perpendicular to an optical axis at a point at which an off-axial principal ray intersects the optical axis.

The image pickup apparatus according to the present invention includes a modulating element controller 108 which controls the phase modulating element 101 to provide a phase amount to a beam passing through the phase modulating element 101, and an image pickup element controller 109 which divides the image pickup element 102 into three or more areas and reads the image information by an area-by-area basis for the multiple divided areas in a time-sharing manner. When the image pickup element controller 109 reads the image information by an area-by-area basis for the multiple divided areas in a time-sharing manner, the modulating element controller 108 attempts to reduce a wavefront aberration for each of the divided areas of the image pickup element 102. Specifically, the phase modulating element 101 modulates the phase amount to be provided to the passing beam. Here, the wavefront aberration corresponds to such aberration that occurs as a result of superimposition of various kinds of aberrations.

Here, of the multiple divided areas, an area containing the center of the image pickup element 102 has the largest size or has the same size as the other areas. That is, no area is included in the multiple divided areas whose size is larger than the area containing the center of the image pickup element 102 in the multiple divided areas. In other word, the area containing the center of the image pickup element 102 has the largest size in the multiple divided areas. In addition, the number of divided areas is changed depending on a zoom position of the image pickup optical system 105. For example, the number of divided areas is set to be larger at a wide-angle end than at a telephoto end. The phase amount modulated by the phase modulating element 101 is set so as to minimize the wavefront aberration at the center of the divided area. Alternatively, the average of wavefront aberrations in the divided area is calculated, and then, the phase amount is set so as to minimize the wavefront aberration at a point having the wavefront aberration identical to the average value in the area. Apart from that, certain weighting is performed on wavefront aberrations in the divided area, and then, the phase modulation is performed so as to minimize the wavefront aberration at a point having the highest weight in the area. Further, the phase modulating element may be formed of an element whose thickness is partially variable.

First Embodiment

FIG. 1 is a main part schematic diagram of the first embodiment of the present invention. FIG. 1 is a main part schematic diagram in which the phase modulating element 101 according to the present invention is added to the wide-angle lens (optical system) (image pickup optical system) described in PTL 4. Note that, in the description below, the wavefront aberration of the d-line (594 nm) is used for the calculation of the wavefront aberration. Needless to say, the wavelength may be selected arbitrarily depending on wavelengths that use the optical system. Further, in a case of using wavelengths in a wide band, other calculation methods may be employed, such as using a wavelength representing a mean value thereof, or using an average value of wavefront aberrations obtained based on the weighted wavelengths. Further, in the first embodiment and a second embodiment described below, the aspect ratio of the image pickup element 102 is defined as 3:2, but the aspect ratio of the image pickup element 102 is not limited thereto.

In FIG. 1, the optical system 105 is a wide-angle lens whose photographing angle of field has a half angle of field of 42 degrees. In this embodiment, the phase modulating element 101 is disposed at the position of the pupil 103 of the optical system 105 or its vicinity. Examples of the phase modulating element 101 include a liquid crystal and a non-linear crystal, which are made of a material that is changeable in refractive index by applying a voltage. Further, the phase modulating element 101 may be an element that is made of a transmissive material whose thickness is physically changeable. Further, the phase modulating element 101 may be an element whose thickness is partially changeable.

As for a phase lag amount in the phase modulating element 101 of this embodiment, a phase modulating amount is determined based on the product of a change amount of the refractive index of the material (in this case, liquid crystal) and the thickness of a liquid crystal layer 201. The phase modulating amount $\Delta\phi$ is expressed as follows:

$$\Delta\phi = \Delta n \times T/\lambda$$

where $\Delta n$ represents the change amount of the refractive index, T represents the thickness of the material, and $\lambda$ represents the used wavelength. In this manner, by using a change in refractive index, it is possible to modulate the phase of an exit wavefront, relative to the incident wavefront. Apart from using the liquid crystal element, such a change in refractive index may also be realized by using a material (non-linear crystal element) having a non-linear optical characteristic such as the Pockels effect or the Kerr effect. However, a change in the refractive index of a liquid crystal or a crystal has polarization dependence. To address this, for example, the following method may be used. That is, when used in an image pickup optical system (optical system), two sheets of liquid crystals are attached together so as to make their directions of polarization dependence perpendicular to each other as described on pages 149 to 153 of NPL 1, thereby reducing the polarization dependence.

Alternatively, a transparent body having a refractive index of 1 or larger, such as a gel or a liquid, may be sandwiched in a physically-movable member so as to partially change the thickness (make the thickness partially variable), thereby also performing the phase modulation. In this case, the phase modulating amount is determined based on a difference in thickness and the refractive index of the material.

Figure 2:
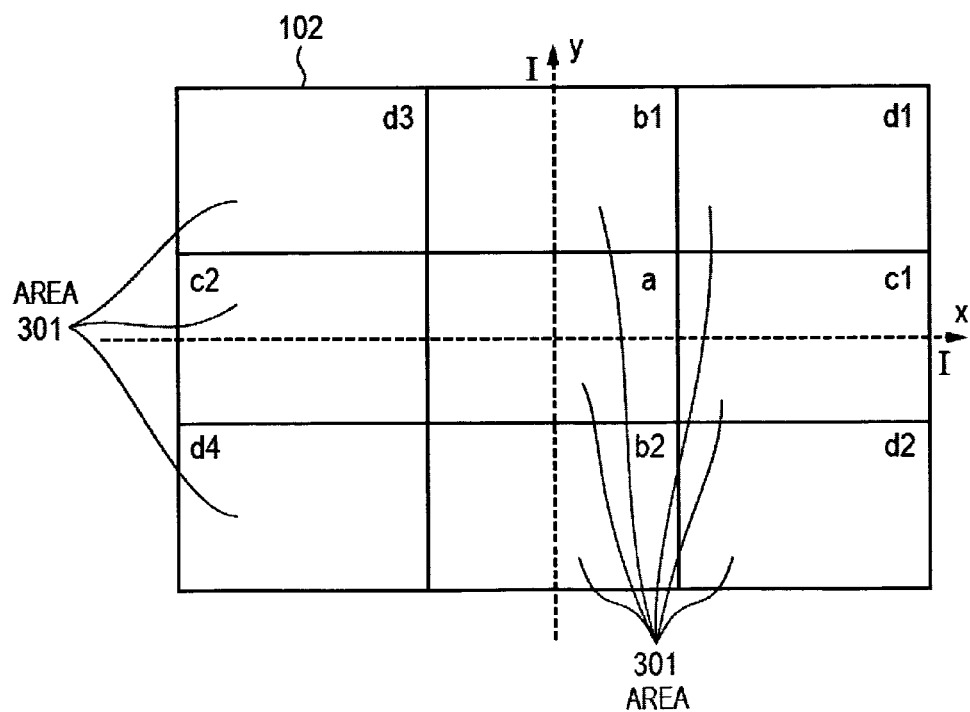
FIG. 2 is a diagram illustrating an area division pattern on an image plane according to the first embodiment.

In this embodiment, for example, it is assumed that the CMOS image pickup element 102 is divided into multiple areas by the image pickup element controller 109 as illustrated in FIG. 2.

In this embodiment, it is assumed that a division number is nine, and that all of nine divided areas 301 have the same size. The division number may be any number as long as the division number is equal to or larger than three. Here, FIGS. 3A to 3D respectively illustrate the wavefront aberrations corresponding to the central angles of field of the respective areas 301. FIGS. 3A to 3D respectively illustrate the wavefront aberrations of the respective angles of field in the cross section illustrated in FIG. 1. Note that, as the optical system of this embodiment, a rotationally-symmetric optical system is employed, and hence, for example, the wavefront aberrations of areas d2 to d4 have the same shapes as the wavefront aberration of an area d1, which are respectively rotated about an optical axis 106. Similarly, the wavefront aberrations in areas b1 and b2 have shapes symmetric to each other about the optical axis 106. The same applies for areas c1 and c2.

Figure 3A:
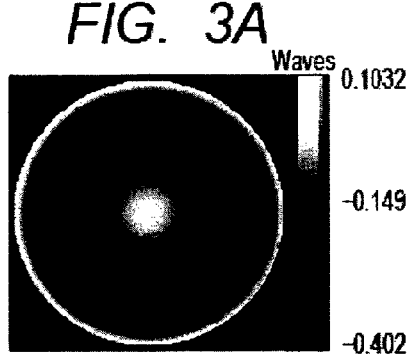
FIG. 3A is a diagram illustrating wavefront aberration in an area a according to the first embodiment.
Figure 3B:
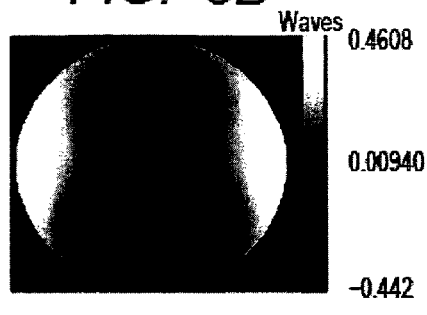
FIG. 3B is a diagram illustrating wavefront aberration in areas b1 and b2 according to the first embodiment.
Figure 3C:
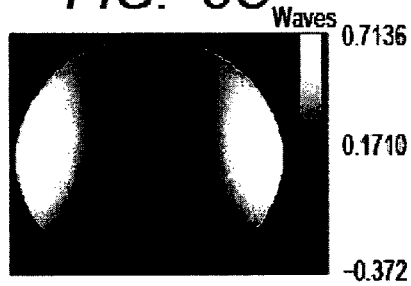
FIG. 3C is a diagram illustrating wavefront aberration in areas c1 and c2 according to the first embodiment.
Figure 3D:
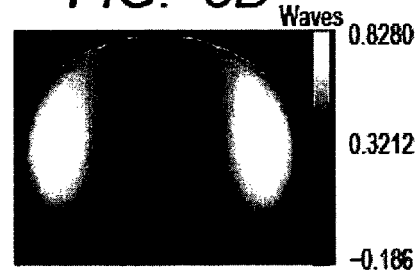
FIG. 3D is a diagram illustrating wavefront aberration in areas d1 to d4 according to the first embodiment.
Figure 4A:
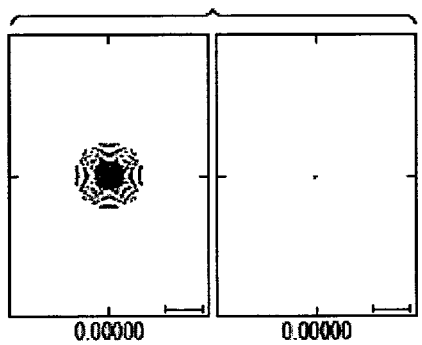
FIG. 4A is a diagram illustrating spots of the area a obtained before and after a phase modulating element performs modulation according to the first embodiment.
Figure 4B:
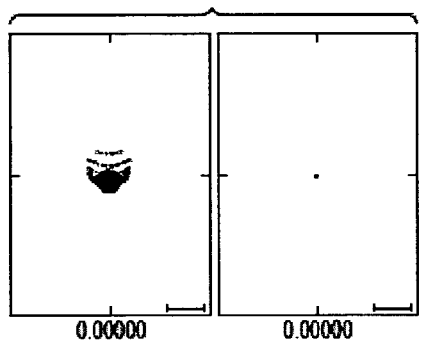
FIG. 4B is a diagram illustrating spots of the area b obtained before and after the phase modulating element performs the modulation according to the first embodiment.
Figure 4C:
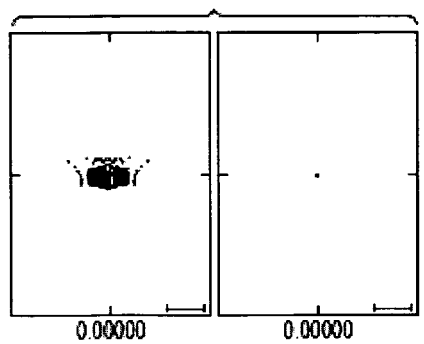
FIG. 4C is a diagram illustrating spots of the area c obtained before and after the phase modulating element performs the modulation according to the first embodiment.
Figure 4D:
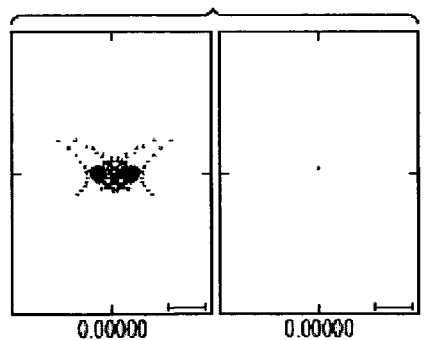
FIG. 4D is a diagram illustrating spots of the area d obtained before and after the phase modulating element performs the modulation according to the first embodiment.

FIG. 3A corresponds to an area a of FIG. 2, FIG. 3B corresponds to the area b1 and b2 of FIG. 2, FIG. 3C corresponds to the areas c1 and c2 of FIG. 2, and FIG. 3D corresponds to the areas d1 to d4 of FIG. 2.

In this case, the modulating element controller 108 causes the phase modulating element 101 to perform modulation so that, for example, the wavefront aberrations illustrated in FIGS. 3A to 3D are canceled with respect to the central angles of field of the respective areas 301. Specifically, the phase modulating element 101 is caused to perform the modulation so as to generate a phase lag, and an attempt is made to make a difference in wavefront distribution on the pupil 103 become closer to 0. On this occasion, the wavefront aberration does not need to be completely 0, and as long as sufficient optical performance is maintained as the image pickup optical system, it poses no problem that there remains a certain wavefront aberration. In this embodiment, the correction is performed until the wavefront aberrations illustrated in FIGS. 3A to 3D become equal to or smaller than 20 mλ.

Hereinafter, a flow of the phase modulation performed at the time of image pickup is described. Upon start of the image pickup, a control unit 107 refers to a lookup table (LUT) 104. In the LUT 104, the phase modulating amount to be generated is determined according to the divided area. Thus, the phase modulating amount required for the area is extracted. Then, the control unit 107 sends information on an area for which the reading is performed in a time-sharing manner and on the phase modulating amount required for the area, to the modulating element controller 108 used for the phase modulating element 101 and the image pickup element controller 109 used for the image pickup element 102. Based on the sent information, the modulating element controller 108 and the image pickup element controller 109 control the phase modulating element 101 and the image pickup element 102, respectively. For example, at the time of reading the image information of the area a on the image pickup element 102, the modulating element controller 108 provides such a phase difference that can cancel the wavefront aberration at a angle of field of 0 degrees to the phase modulating element 101 in a time-sharing manner. In synchronization with this, the image pickup element controller 109 reads the image information only from the area a of the image pickup element 102.

Similarly, at the time of image pickup for each of the areas b1 to d4, the modulating element controller 108 performs control so as to provide, to the phase modulating element 101, such a phase difference that can correct the wavefront aberration at the central angle of field of each of the areas. Then, the image pickup element controller 109, which includes a separate reading unit, performs control so as to similarly perform the reading of the image information in a time-sharing manner at temporally different timings for the respective areas of the image pickup element 102. The phase difference to be provided to each area 301 by the phase modulating element 101 is determined based on data on a wavefront aberration correcting amount stored in the LUT 104. The LUT 104 stores the wavefront aberration correcting amount corresponding to each of the areas 301. Note that, in addition to the correcting amount with respect to the angle of field of the optical system 105, the wavefront aberration correcting amount may incorporate a correcting amount determined based on a focus position with respect to the optical system 105. Further, in this embodiment, the correction for the single-focal-length optical system is described. However, for example, in the case of a zoom lens, it is only necessary to incorporate the correcting amount determined based on each zoom position into the LUT 104, thereby changing the correcting amount for each focal length.

Table 1 is a table showing the angles of field of each area and the ranges of each area on the image pickup element 102. In Table 1, x represents a longitudinal direction of the screen, and y represents a direction perpendicular to x. The center of the screen (the optical axis in the case of a co-axial system) is assumed to be 0 degrees. The same coordinate directions are also used in embodiments described below. Further, the areas b1 and b2 are symmetric about an x axis, the areas c1 and c2 are symmetric about a y axis, and the areas d1 to d4 are rotationally symmetric about the optical axis 106, and hence the values of the area a are indicated as Area A, the values of the area b1 are indicated as Area B, the values of the area c1 are indicated as Area C, and the values of the area d1 are indicated as Area D. For the values of the other areas b2, c2, and d2 to d4, only the signs of values of Areas B to D of Table 1 need to be changed. For example, for the area d2, only the signs of values regarding y in Area D need to be reversed. Similarly, for the area d4, only the signs of values regarding both x and y need to be reversed, and, for the area d3, only the signs of values regarding x need to be reversed. In the embodiments described below, similarly, of the areas symmetric to each other, the values of an area having the smallest number are used.

The coordinate values of each area represent ratios obtained when an x-coordinate and a y-coordinate at a maximum angle of field on the image pickup element 102 are respectively assumed to be 1. FIGS. 4A to 4D illustrate spot shapes at the central angles of field of the respective areas 301 obtained before and after the phase modulating element 101 performs the wavefront modulation. As can be seen from FIGS. 4A to 4D, remarkable improvements can be recognized in the spot shapes after the wavefront modulation is performed in comparison to before the wavefront modulation.

In this way, the phase modulating element 101 is interposed at the position of the pupil 103 of the optical system 105, and the image pickup element 102 is divided into the multiple areas, thereby causing the phase modulating element 101 to perform optimal wavefront aberration correction for each area. As a result, aberration correction can be favorably performed for the optical system. Further, in the case of an optical system for image pickup, with respect to beams having large angles of field, part of pupil beams are vignetted in order to improve the optical performance, thereby reducing aberration. However, if the method of the present invention is used, the aberration correction can be performed even for angles of field of outermost edges. Therefore, vignetting amounts at peripheral angles of field can be reduced, and peripheral light amounts are expected to be increased. Note that, in a case where the optical system is rotationally asymmetric, it is conceivable that the divided areas respectively have different shapes of wavefront aberration. In such a case, wavefront aberration correcting amounts each corresponding to the different shapes only need to be incorporated into the table.

Further, in a case where the image pickup element 102 is divided into areas as described above, it is desired to use, as the image pickup element 102, a CMOS image pickup element, which performs reading on a pixel basis, rather than a CCD image pickup element, which performs line-reading. By employing the CMOS image pickup element, areas of the image pickup element to be read can be changed with more ease.

TABLE 1

| | x-coordinate | y-coordinate | x angle of field (deg) | y angle of field (deg) |
|---|---|---|---|---|
| Area A | −0.33~0.33 | −0.33~0.33 | −15.501~15.501 | −10.476~10.476 |
| Area B | −0.33~0.33 | 0.33~1.00 | −15.501~15.501 | 10.476~26.540 |
| Area C | 0.33~1.00 | −0.33~0.33 | 15.501~36.840 | −10.476~10.476 |
| Area D | 0.33~1.00 | 0.33~1.00 | 15.501~36.840 | 10.476~26.540 |

Second Embodiment

Hereinafter, the second embodiment of the present invention is described. An optical system used in this embodiment is the same as in the first embodiment. Further, in the figures described below, components with the same reference symbols have the same functions, and thus description thereof is herein omitted. In the case of the first embodiment, the image pickup element 102 is divided into nine areas having the same size. However, as illustrated in FIG. 6, the wavefront aberration is larger on the periphery of the image pickup element (at a larger angle of field), and accordingly, the wavefront aberration may significantly differ even within the same area.

Conversely, there is also a case where the wavefront aberration becomes the largest at about a middle angle of field of the screen and becomes smaller again as closer to the periphery thereof. Accordingly, if the wavefront aberration at the center of the area is adopted, the aberration conversely deteriorates on the periphery of the area, resulting in a deformed spot shape. In view of the above, in principle, it is desired that the wavefront aberration be corrected with one area corresponding to one pixel. However, the image pickup takes a longer period of time, and an ultra-high modulation speed is required for the phase modulating element, and hence increasing the division number is not desired.

Figures 5, 6:
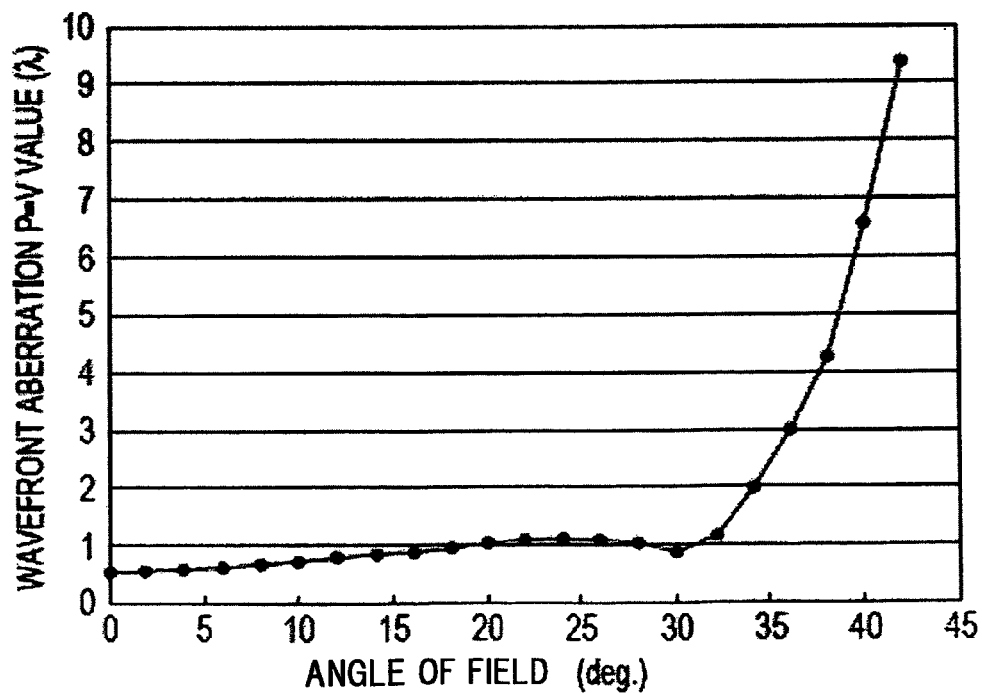
FIG. 5 is an explanatory diagram of a second embodiment of the present invention.
FIG. 6 is a diagram illustrating relation between an angle of field and a wavefront aberration amount according to the second embodiment.

To address this problem, in this embodiment, as illustrated in FIG. 5, the image pickup element 102 is divided into larger areas (sizes) in the vicinity of the center of the screen where the change amount in wavefront aberration is smaller, and into the same or smaller areas in a portion closer to the periphery of the screen. By doing so, while solving the above-mentioned problem of reverse correction, the number of divided areas is reduced. Further, even in areas on the periphery of the screen, the spot shape can be prevented from being deformed. Moreover, the number of modulations performed by the phase modulating element 101 during the same period of time for the image pickup becomes smaller, and hence the modulation speed of the phase modulating element 101 can be suppressed to be low. In this embodiment, based on the results of wavefront aberration amounts illustrated in FIG. 6, the diagonal angle of field of an area a is set to 0 to 32 degrees, the diagonal angles of field of areas d1 to d4 are set to 32 to 38 degrees, and the diagonal angles of field of areas i1 to i4 are set to 38 to 42 degrees. For example, in a case where the entire screen is divided into areas having the same size, if the division is made using the same size as the area i, the screen needs to be divided into fifty or more areas. However, if smaller areas are used only on the periphery of the screen as in this embodiment, the number of divided areas can be reduced significantly, and also, the effect of improved optical performance can be maintained. In addition, the modulation speed of the phase modulating element 101 can be decreased.

Figure 7:
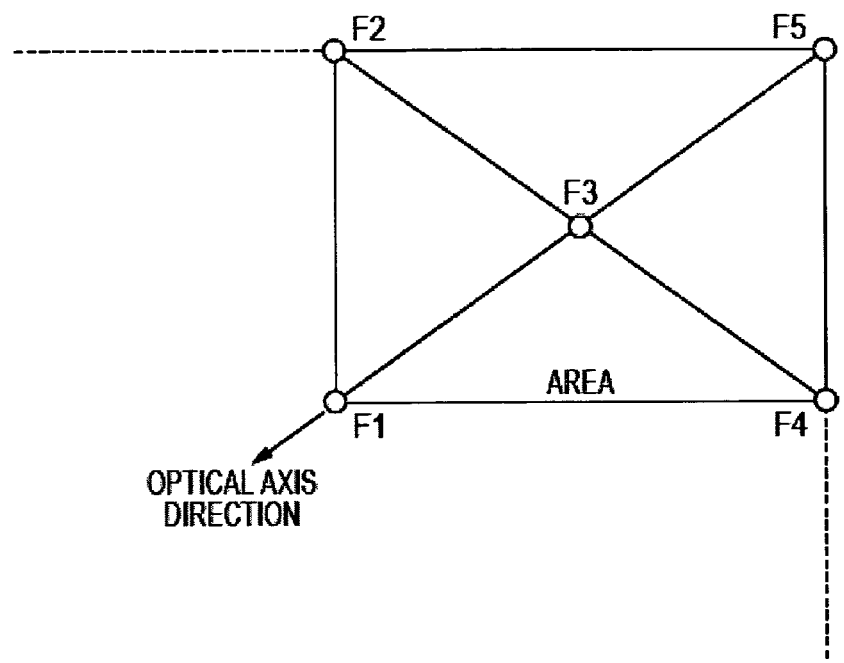
FIG. 7 is a diagram illustrating positions of angle of field in each area according to the second embodiment.

Further, the following method is applied to the respective areas (a, b1 and b2, c1 and c2, d1 to d4, e1 and e2, f1 to f4, g1 and g2, h1 to h4, and i1 to i4) illustrated in FIG. 5. Specifically, based on the average of wavefront aberrations at the center and four corners (F1 to F5) of the area as illustrated in FIG. 7, the phase amount which is to be provided to the passing beam by the phase modulating element 101 is determined. Specifically, the phase modulating amount is determined so as to minimize the wavefront aberration at a point having such a wavefront aberration that is the same as or similar to the average value of the wavefront aberrations in the area.

Figure 8:
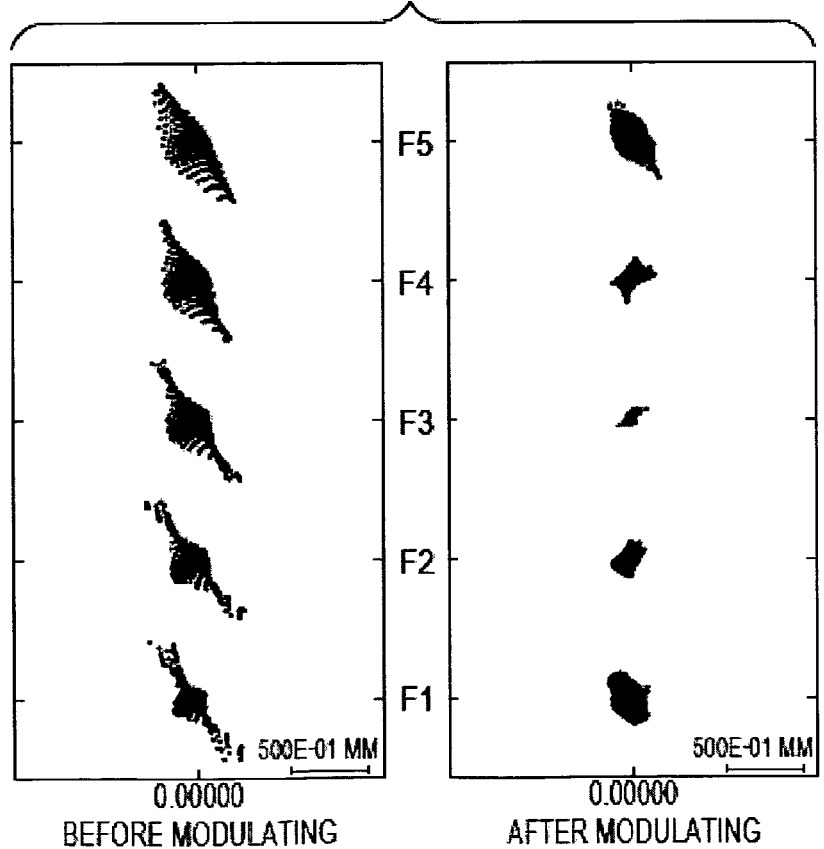
FIG. 8 is a diagram illustrating spots of an area i1 obtained before and after the phase modulating element performs the modulation according to the second embodiment.
Figure 9:
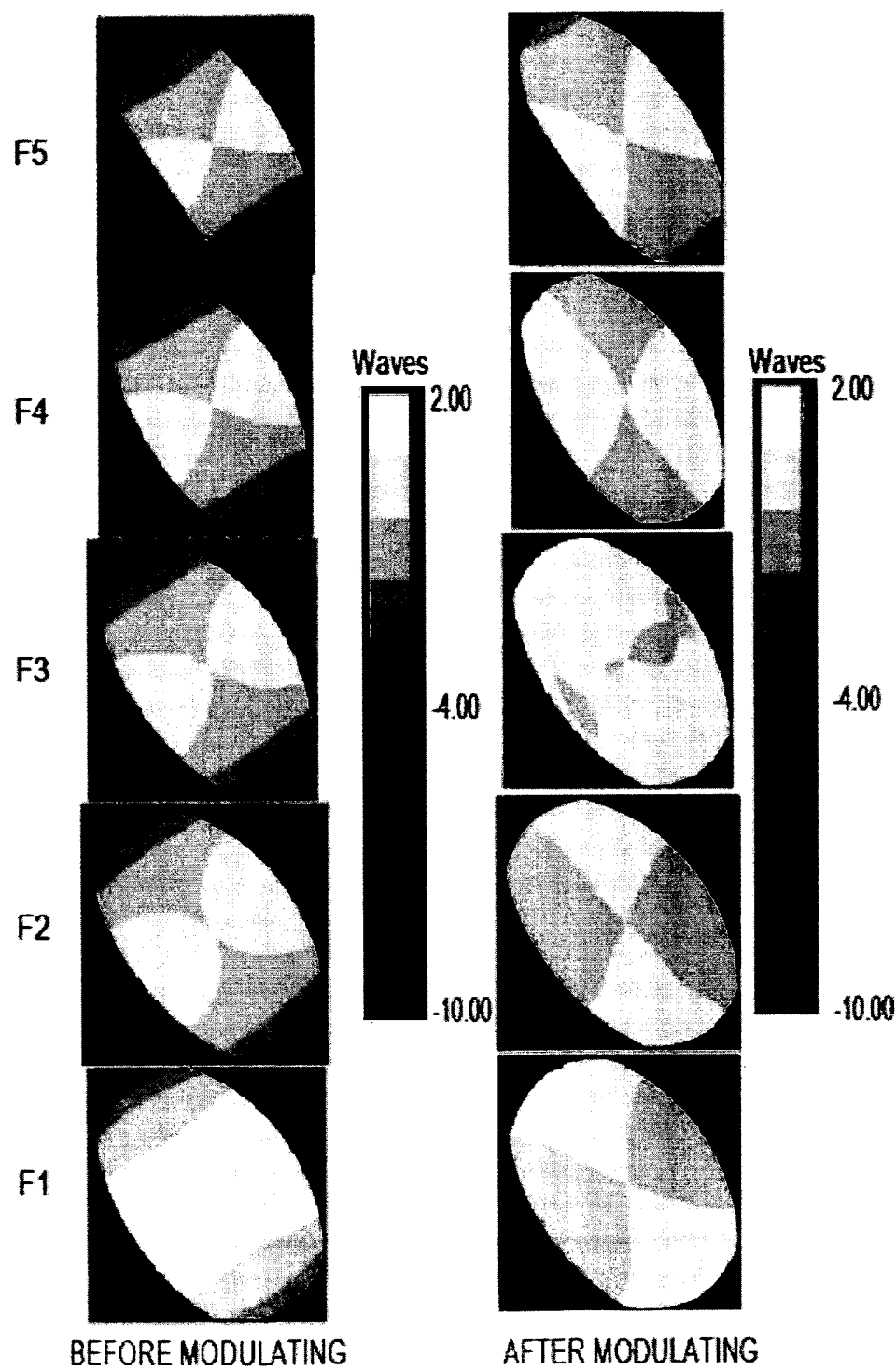
FIG. 9 is a diagram illustrating wavefront aberrations of the area i1 obtained before and after the phase modulating element performs the modulation according to the second embodiment.
Figure 10:
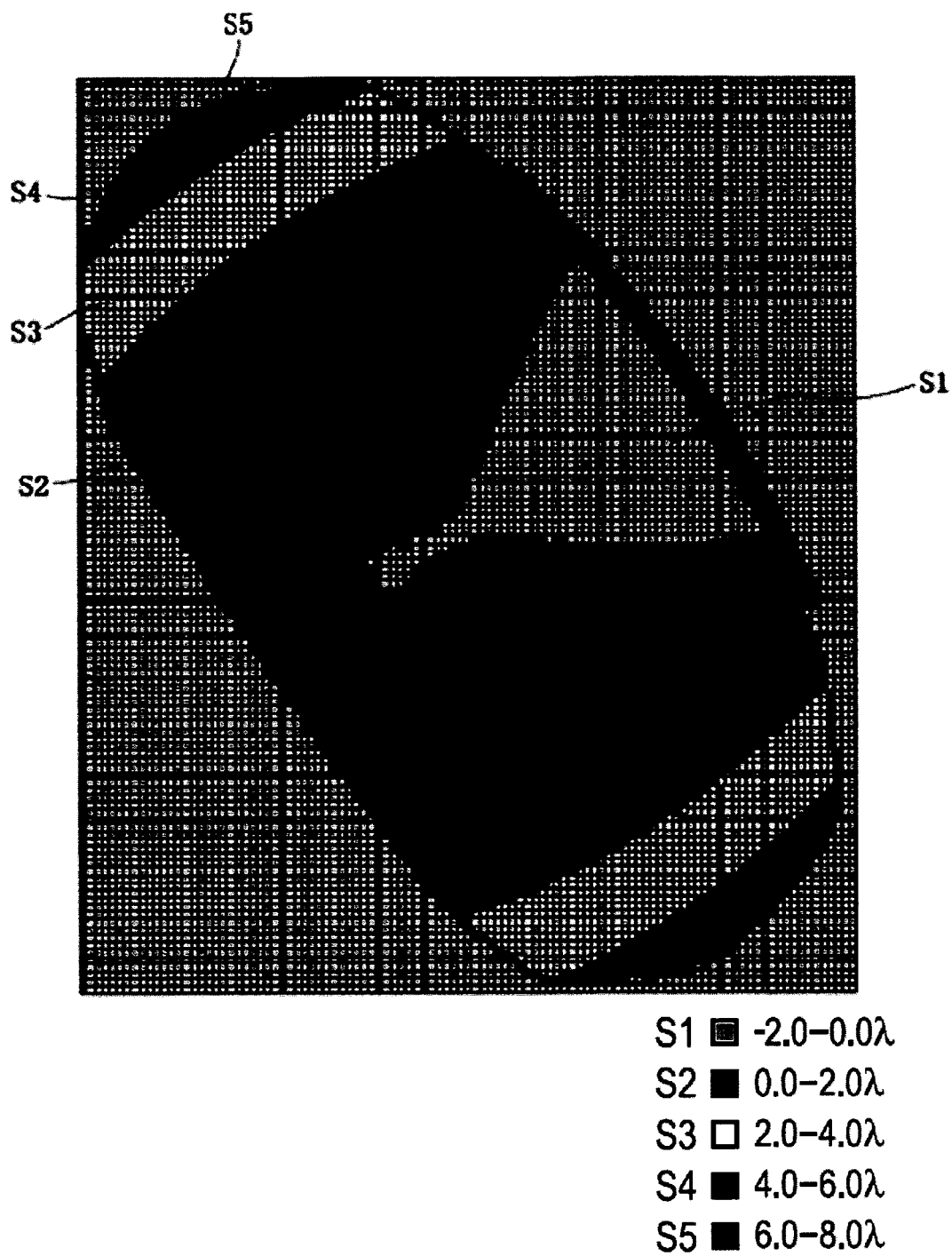
FIG. 10 is a diagram illustrating phase modulating amounts provided to the phase modulating element with regard to the area i1 according to the second embodiment.
Figure 11:
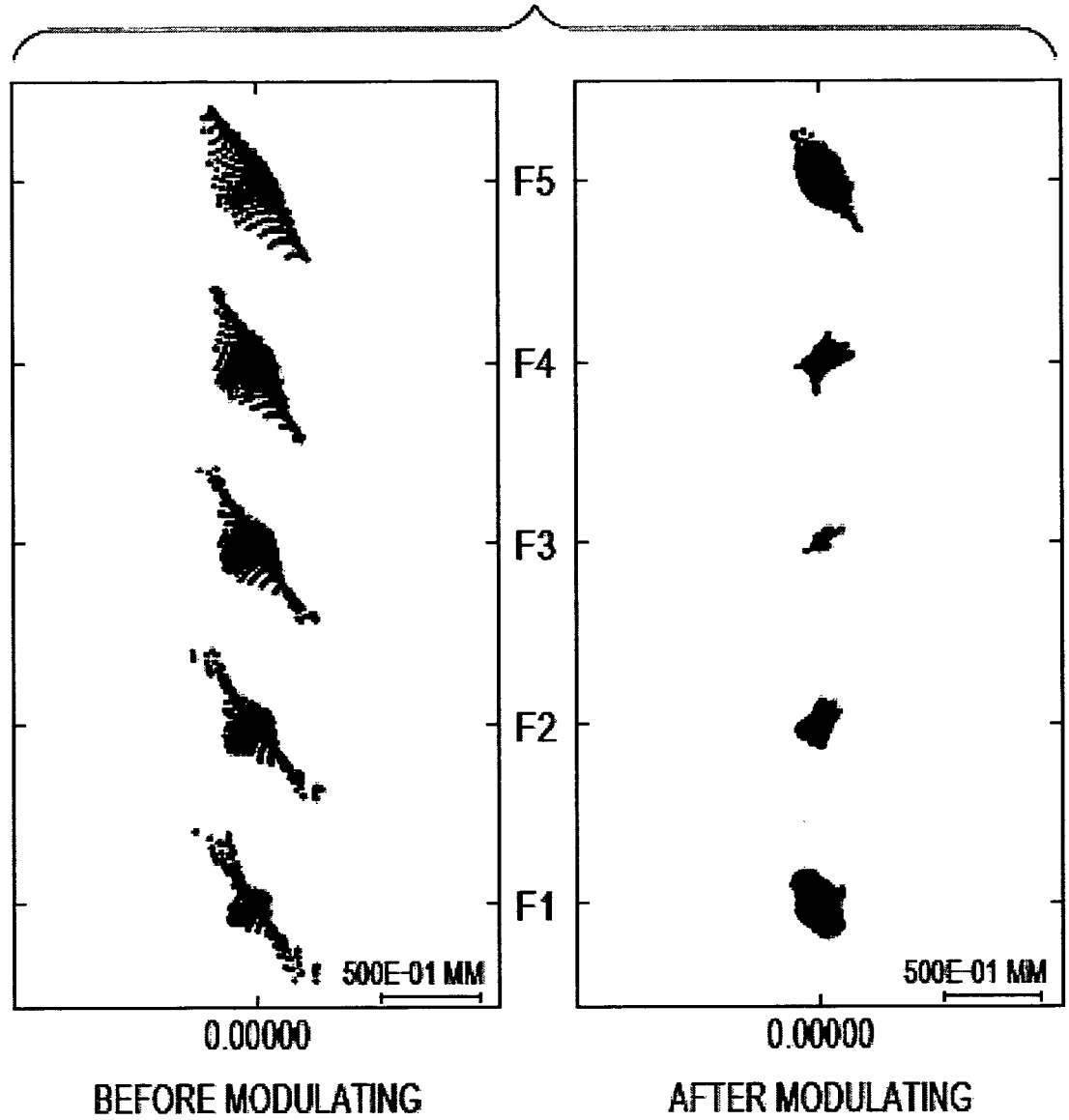
FIG. 11 is a diagram illustrating spots of an area d1 obtained before and after the phase modulating element performs the modulation according to the second embodiment.
Figure 12:
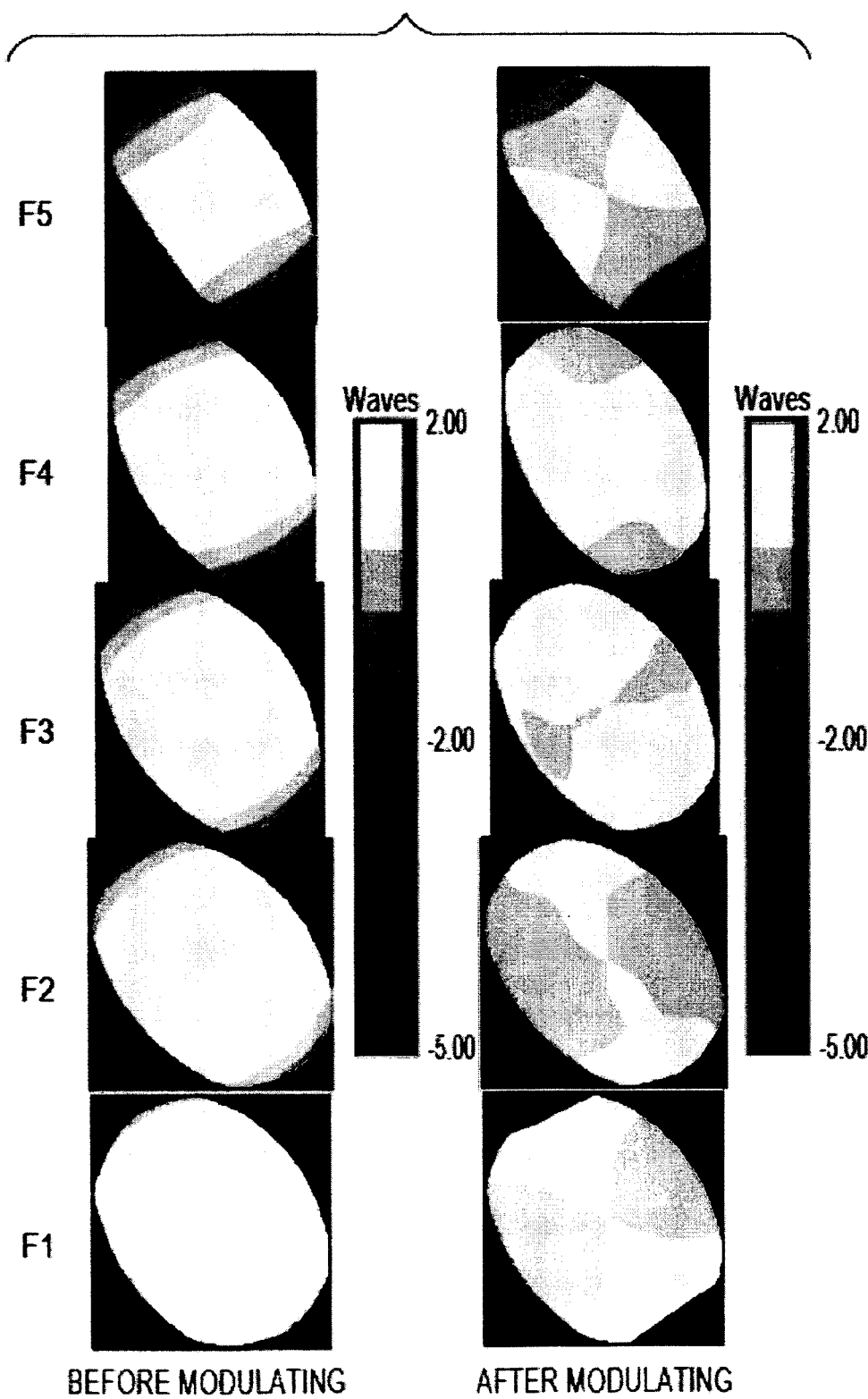
FIG. 12 is a diagram illustrating wavefront aberrations of the area d1 obtained before and after the phase modulating element performs the modulation according to the second embodiment.
Figure 13:
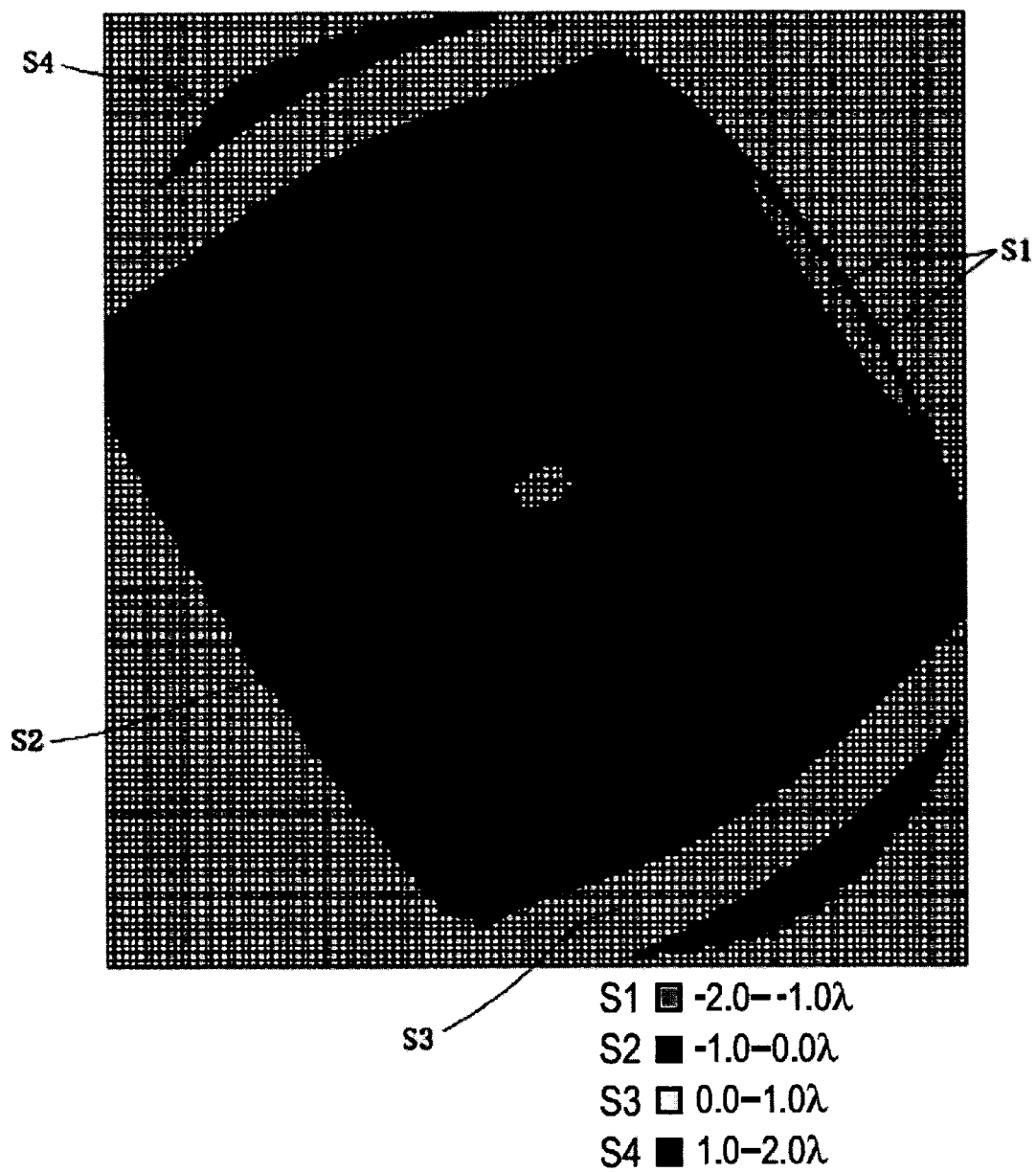
FIG. 13 is a diagram illustrating phase modulating amounts provided to the phase modulating element with regard to the area d1 according to the second embodiment.
Figure 14:
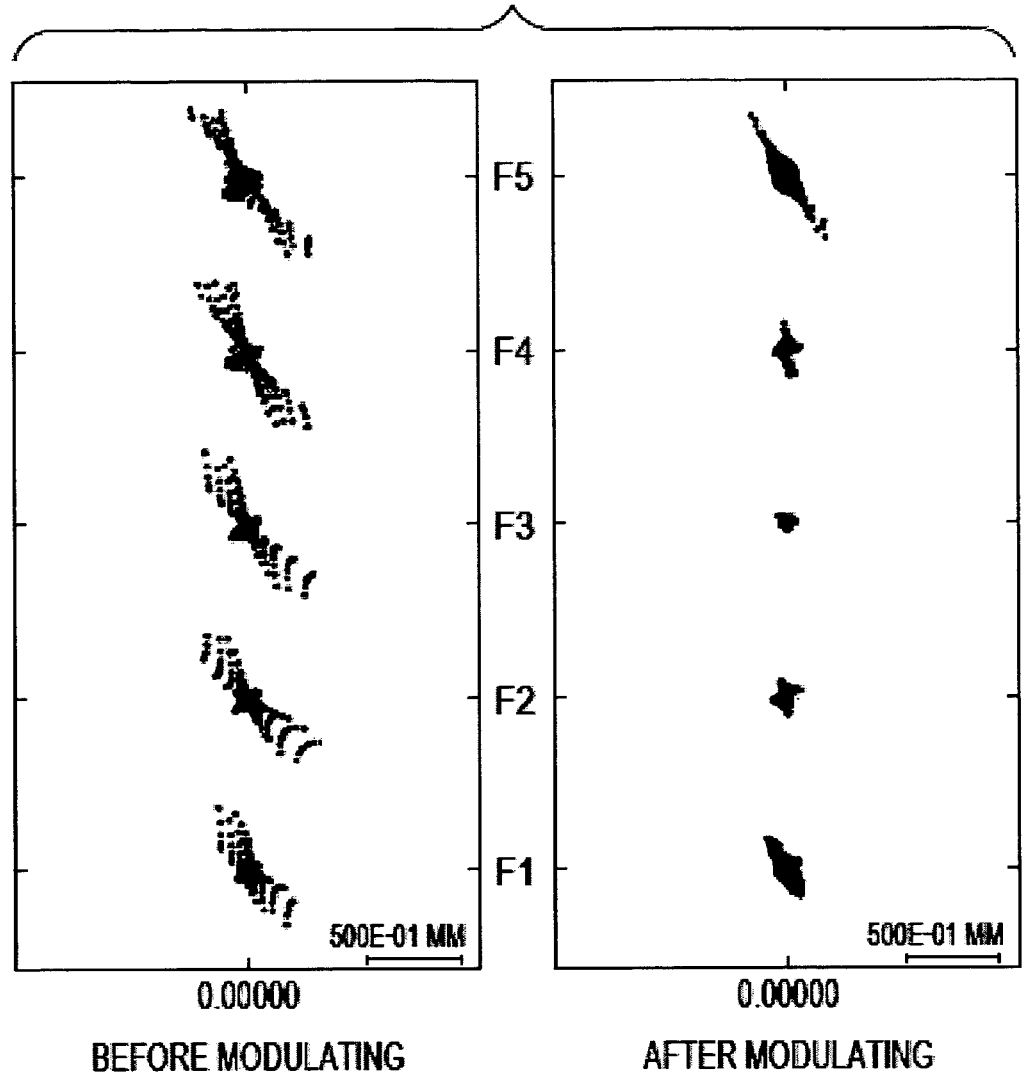
FIG. 14 is a diagram illustrating spots of an area a obtained before and after the phase modulating element performs the modulation according to the second embodiment.
Figure 15:
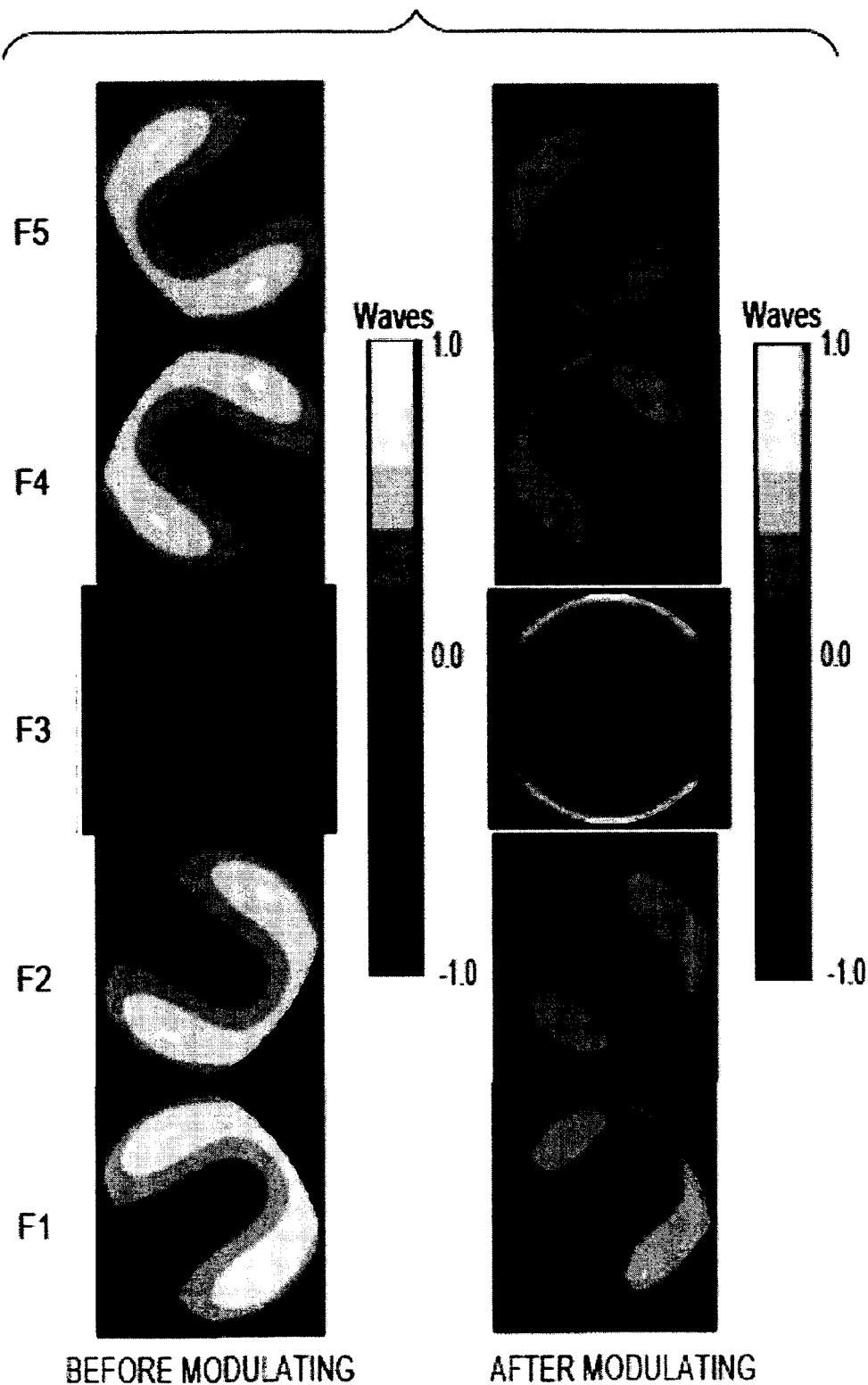
FIG. 15 is a diagram illustrating wavefront aberrations of the area a obtained before and after the phase modulating element performs the modulation according to the second embodiment.
Figure 16:
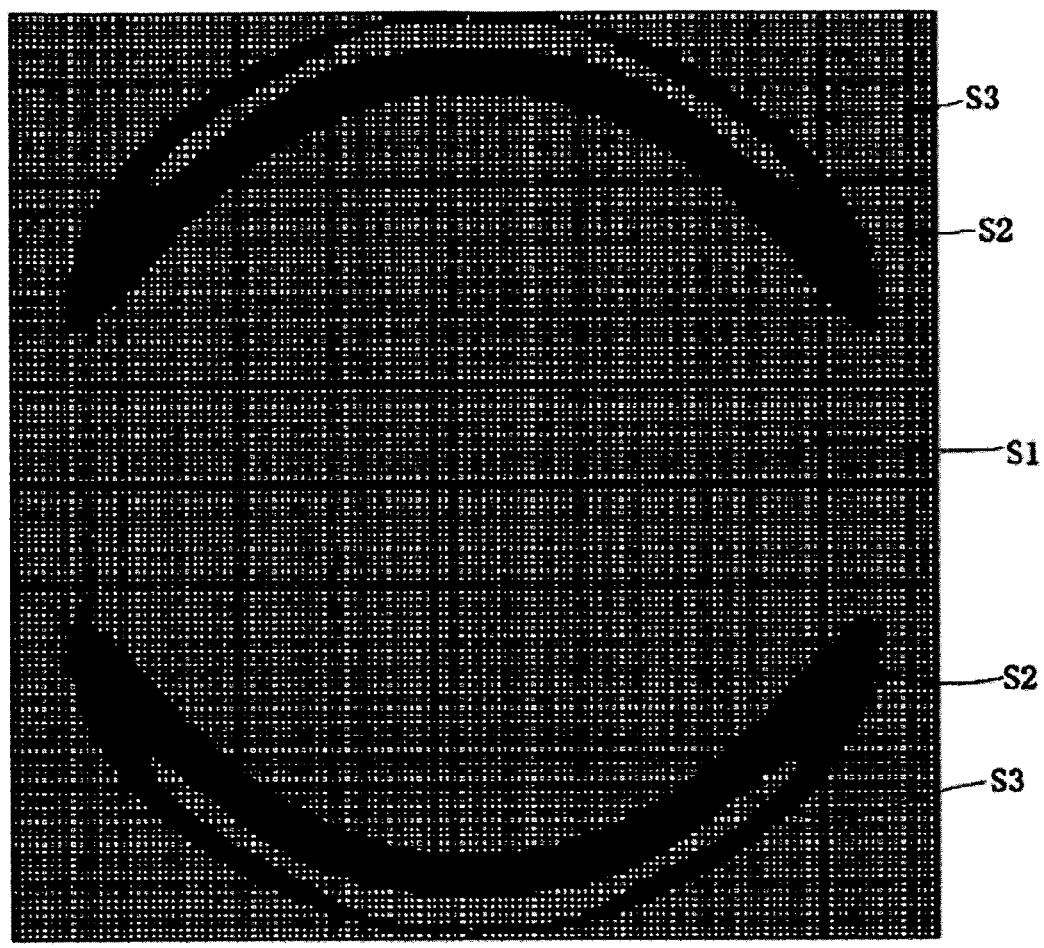
FIG. 16 is a diagram illustrating phase modulating amounts provided to the phase modulating element with regard to the area a according to the second embodiment.

By doing so, the spot shapes in the respective areas are made uniform. Note that, with regard to the area a, a point F3 of FIG. 7 corresponds to a beam in an optical axis direction. Table 2 shows the ranges of angle of field of each area and the ranges of each area on the image pickup element 102. Here, with regard to the representative areas a, d1 and i1, FIGS. 8 to 16 illustrate improved spot shapes and wavefront aberration shapes for the points F1 to F5 illustrated in FIG. 7, and the phase differences provided to the phase modulating element 101. FIGS. 8 to 10 respectively illustrate the spots, the wavefront aberrations and the phase modulating amounts of the area i1, FIGS. 11 to 13 respectively illustrate the spots, the wavefront aberrations and the phase modulating amounts of the area d1, and FIGS. 14 to 16 respectively illustrate the spots, the wavefront aberrations and the phase modulating amounts of the area a. Improvements in spot shape and improvements in wavefront aberration amount can be recognized.

In this way, the areas are made smaller in the portion closer to the periphery of the screen so as to adapt to the wavefront aberration of the optical system 105, and hence improvements in spot shape can be achieved over the entire screen. Further, by making larger the areas in the vicinity of the center of the screen where fluctuations in wavefront aberration are small, the division number can be reduced, and the modulation speed of the phase modulating element can also be lowered. Note that, in consideration of decrease in light amount on the periphery of the screen, which occurs according to the cosine fourth law in the optical system, the following measure may be taken. That is, different exposure periods are used for the areas on the periphery of the screen and for the areas in the vicinity of the center of the screen, and the exposure period for the periphery of the screen is made longer, thereby increasing the peripheral light amount. Further, in view of a fact that the spot shapes are different at boundaries of the areas, for example, such image processing may be added that the reading is performed in a manner that the boundaries of the areas overlap each other, to thereby average images in the vicinity of the boundaries. Further, in this embodiment, it is determined that the phase amount which is to be provided to the passing beam by the phase modulating element 101 based on the average of wavefront aberrations obtained when the stop is at full-aperture state. However, when the stop is changed, other modulating amounts optimal for respective stop values may be used.

TABLE 2

| | x-coordinate | y-coordinate | x angle of field (deg) | y angle of field (deg) |
|---|---|---|---|---|
| Area A | −0.69~0.69 | −0.69~0.69 | −27.471~27.471 | −19.117~19.117 |
| Area B | −0.69~0.69 | 0.69~0.87 | −27.471~27.471 | 19.117~23.431 |
| Area C | 0.69~0.87 | −0.69~0.69 | 27.471~33.027 | −19.117~19.117 |
| Area D | 0.69~0.87 | 0.69~0.87 | 27.471~33.027 | 19.117~23.431 |
| Area E | −0.69~0.69 | 0.87~1.00 | −27.471~27.471 | 23.431~26.540 |
| Area F | 0.69~0.87 | 0.87~1.00 | 27.471~33.027 | 23.431~26.540 |
| Area G | 0.87~1.00 | −0.69~0.69 | 33.027~36.840 | −19.117~19.117 |
| Area H | 0.87~1.00 | 0.69~0.87 | 33.027~36.840 | 19.117~23.431 |
| Area I | 0.87~1.00 | 0.87~1.00 | 33.027~36.840 | 23.431~26.540 |

Third Embodiment

Figure 17:
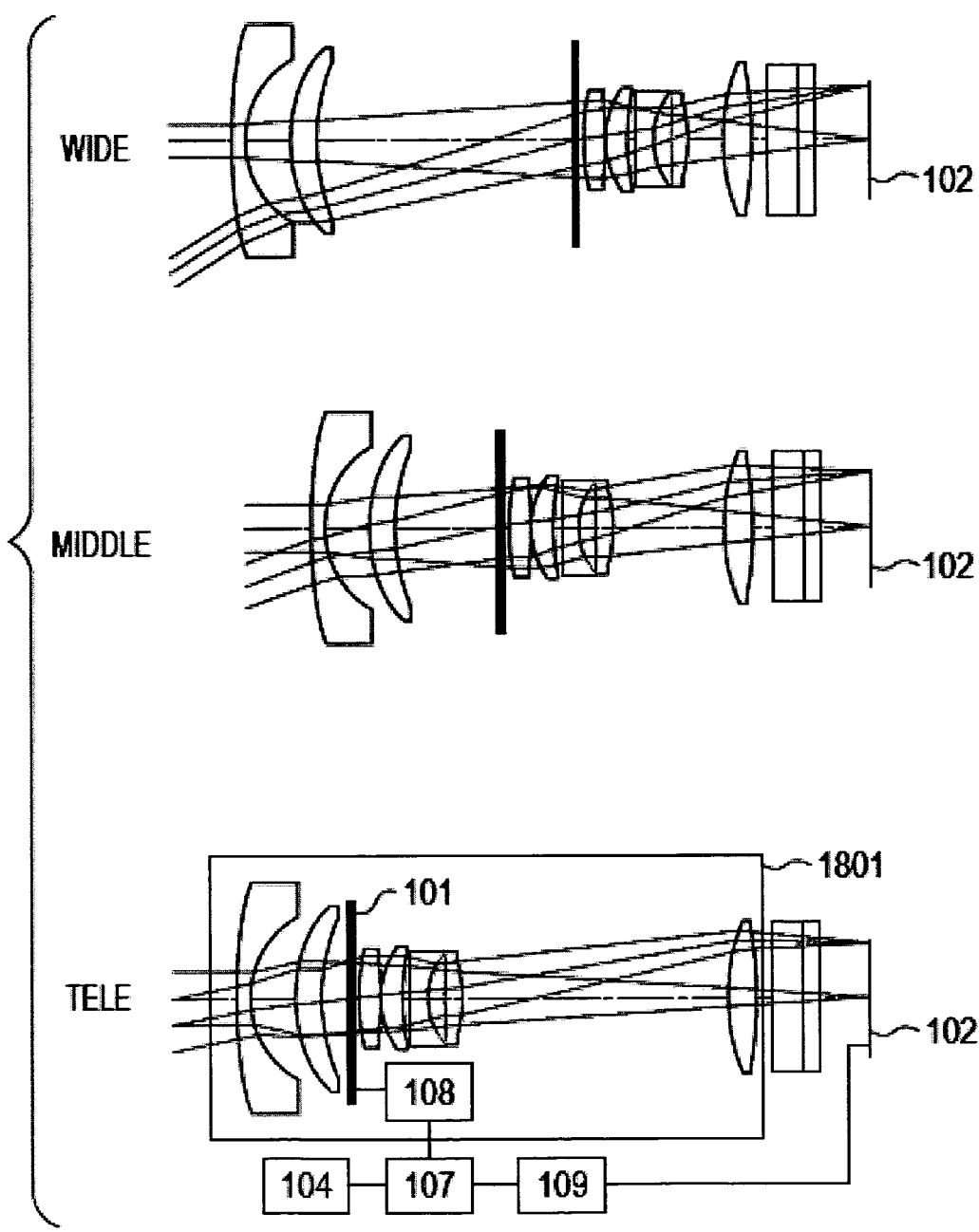
FIG. 17 is an explanatory diagram of a third embodiment of the present invention.

FIG. 17 is a main part schematic diagram of a third embodiment of the present invention. FIG. 17 is a main part schematic diagram in which the phase modulating element 101 is added to the zoom lens 1801 described in the first embodiment of PTL 5. FIG. 17 illustrate the wide-angle end, a middle zoom position (middle position) and the telephoto end, respectively. In FIG. 17, the respective control units of the control unit 107 and the like are omitted for the wide-angle end and the middle position (Middle) and are illustrated only for the telephoto end. Note that, in this embodiment, the aspect ratio of the image pickup element 102 is set to 4:3. The zoom lens 1801 is a zoom lens having a zoom ratio of three with the focal length ranging from 5.6 mm to 16.8 mm, and the angle of field thereof changes from 32.2 degrees to 11.7 degrees in terms of the half angle of field.

Figure 18A:
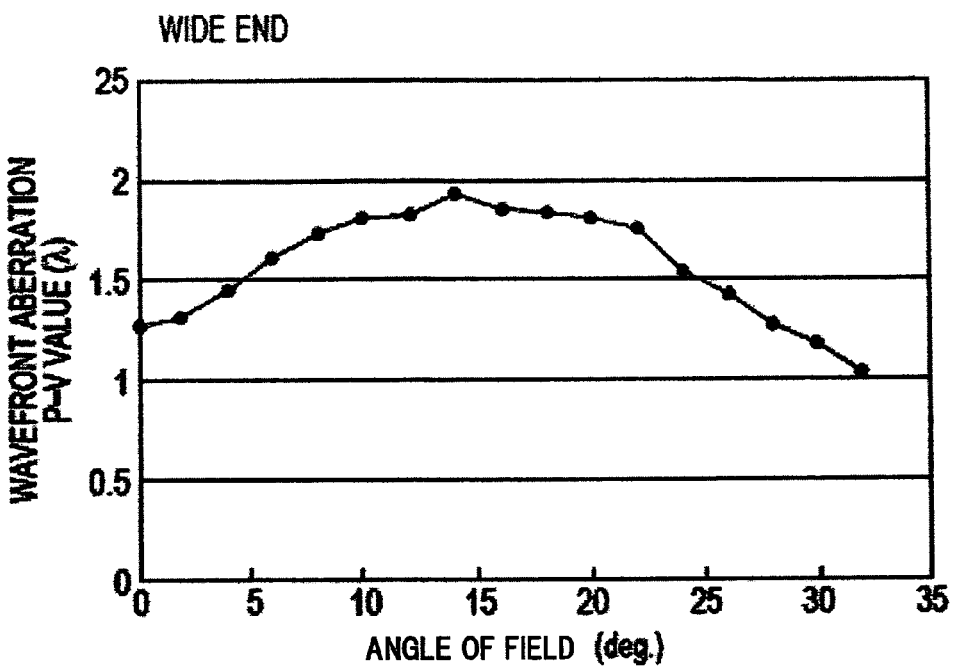
FIG. 18A is a diagram illustrating relation between the angle of field and the wavefront aberration amount at a wide-angle end according to the third embodiment.
Figure 18B:
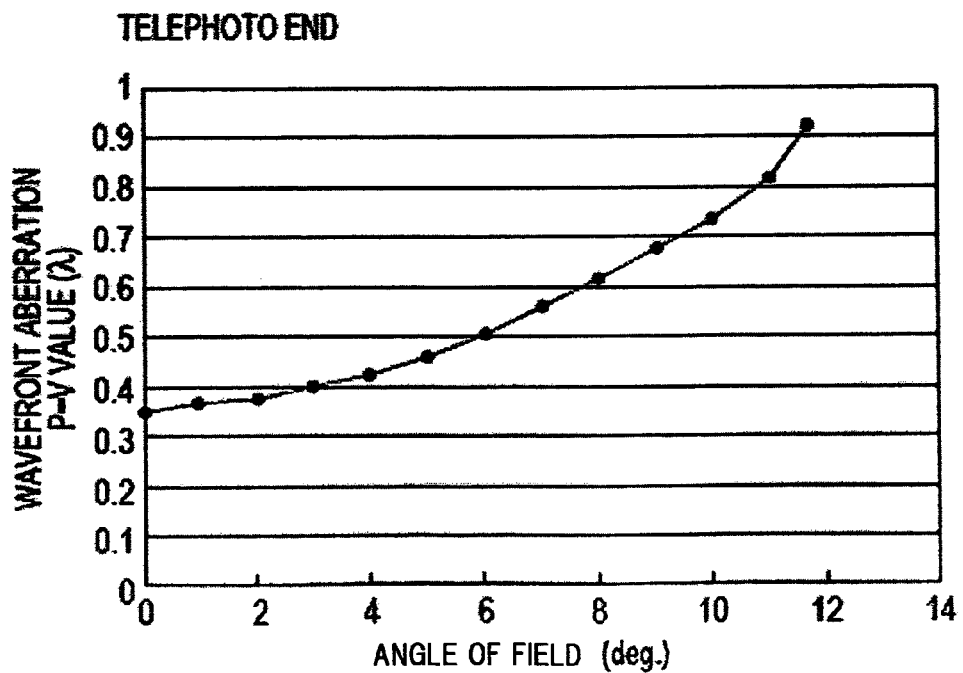
FIG. 18B is a diagram illustrating relation between the angle of field and the wavefront aberration amount at a telephoto end according to the third embodiment.
Figure 19A:
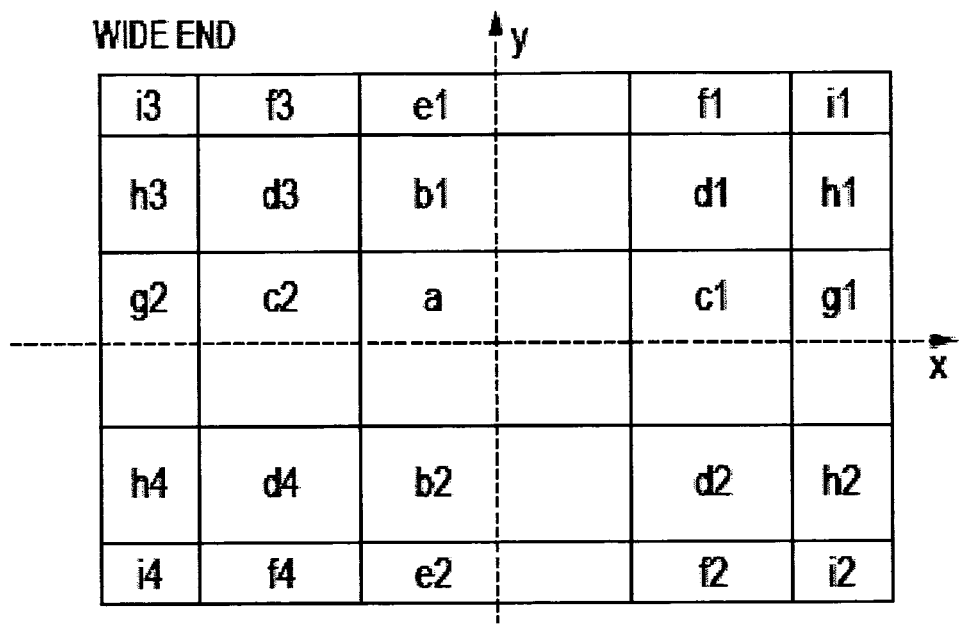
FIG. 19A is a diagram illustrating an area division pattern on the image plane at the wide-angle end according to the third embodiment.
Figure 19B:
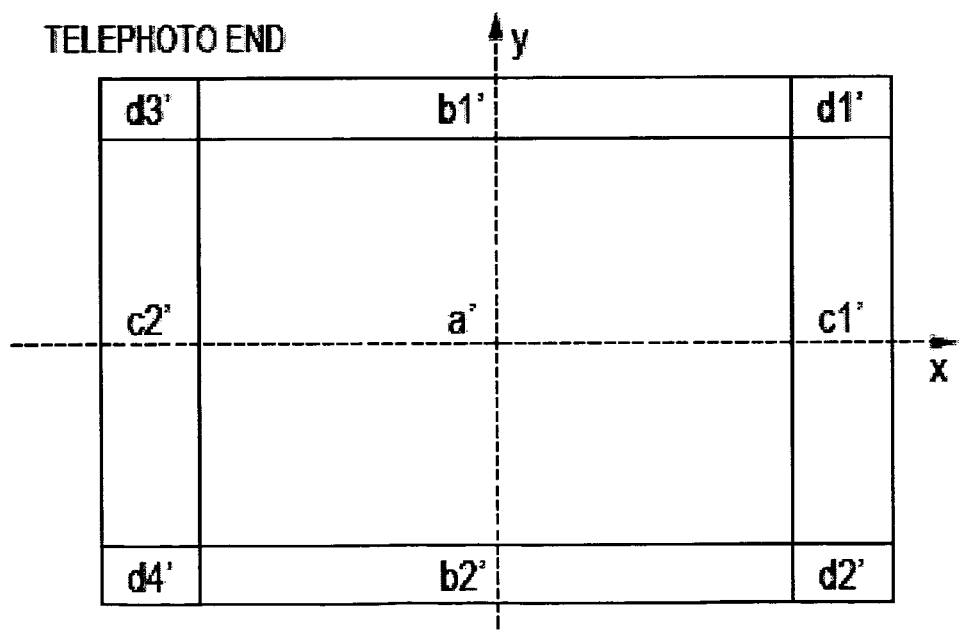
FIG. 19B is a diagram illustrating an area division pattern on the image plane at the telephoto end according to the third embodiment.

In the case of such a zoom lens, as illustrated in FIGS. 18A and 18B, how the wavefront aberration fluctuates according to the angle of field differs significantly between the case of the wide-angle end and the case of the telephoto end. Particularly, in the case of the wide-angle end shown in FIG. 18A, the absolute amount of the wavefront aberration changes significantly from the center of the screen toward the periphery thereof, while the change amount is smaller in the case of the telephoto end shown in FIG. 18B. Further, in the case of the telephoto end, a steady increase is observed from the center of the screen toward the periphery thereof in how the change presents itself, while in the case of the wide-angle end, a steady increase is not observed. To address this, as illustrated in FIGS. 19A and 19B, depending on the zoom position, the number of divided areas is also changed in addition to the change amount of the phase modulating element 101. In the LUT 104, the phase amount is determined according to the zoom position and the position of the divided area. In this way, by changing the number of divided areas according to the zoom position, the correction of the wavefront aberration can be performed more efficiently.

Such change data on the number of areas is also stored in the LUT 104, and hence the phase modulating amount which corresponds to each zoom position can be easily extracted. Further, in view of the fact that the present invention is directed to the image pickup system, it is desired that the shutter speed be made faster at the telephoto end to prevent image bur caused by camera shaking. In this respect, by reducing the number of divided areas at the telephoto end in comparison to the wide-angle end, the effect of increasing the shutter speed can also be provided.

Table 3 and Table 4 show the ranges of angle of field angle of each area and the ranges of each area on the image pickup element 102 for the case of the wide-angle end and the case of the telephoto end, respectively. Further, with regard to representative areas in the case of the wide-angle end and in the case of the telephoto end, FIGS. 20 to 34 illustrate the adopted phase modulating amounts and the spots and the wavefront aberrations before and after the phase modulation is adopted.

Figure 21:
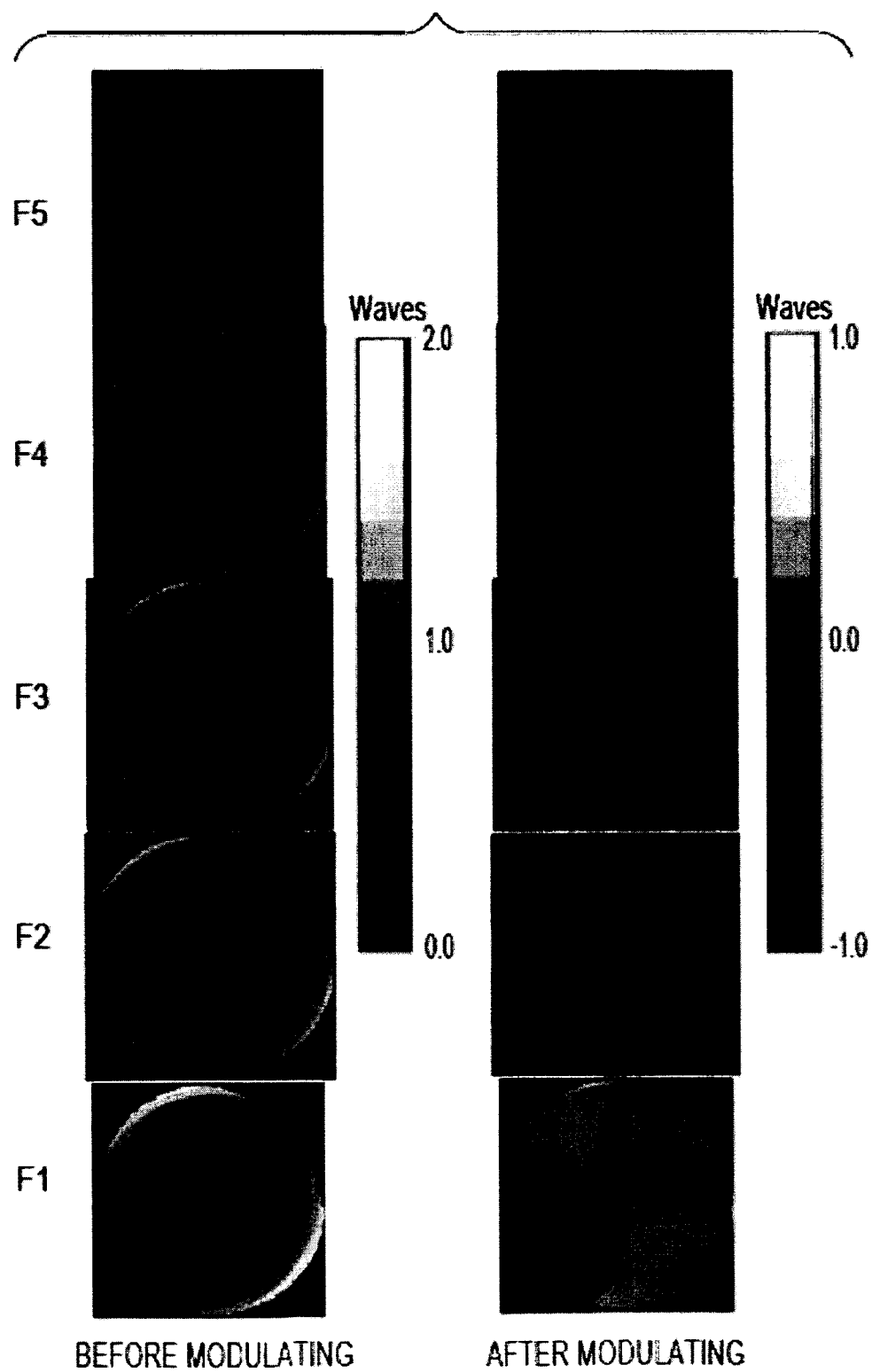
FIG. 21 is a diagram illustrating wavefront aberrations of the area i1 (wide side) obtained before and after the phase modulating element performs the modulation according to the third embodiment.
Figure 22:
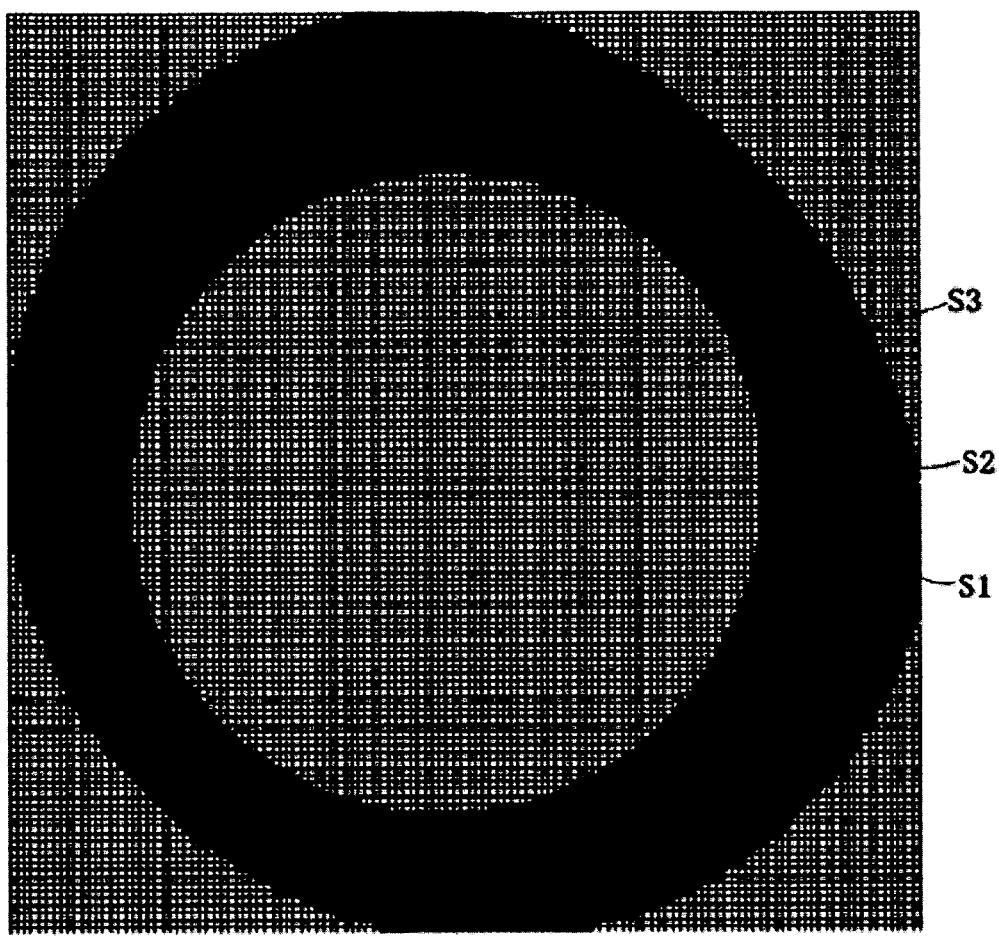
FIG. 22 is a diagram illustrating phase modulating amounts provided to the phase modulating element with regard to the area i1 (wide side) according to the third embodiment.
Figure 23:
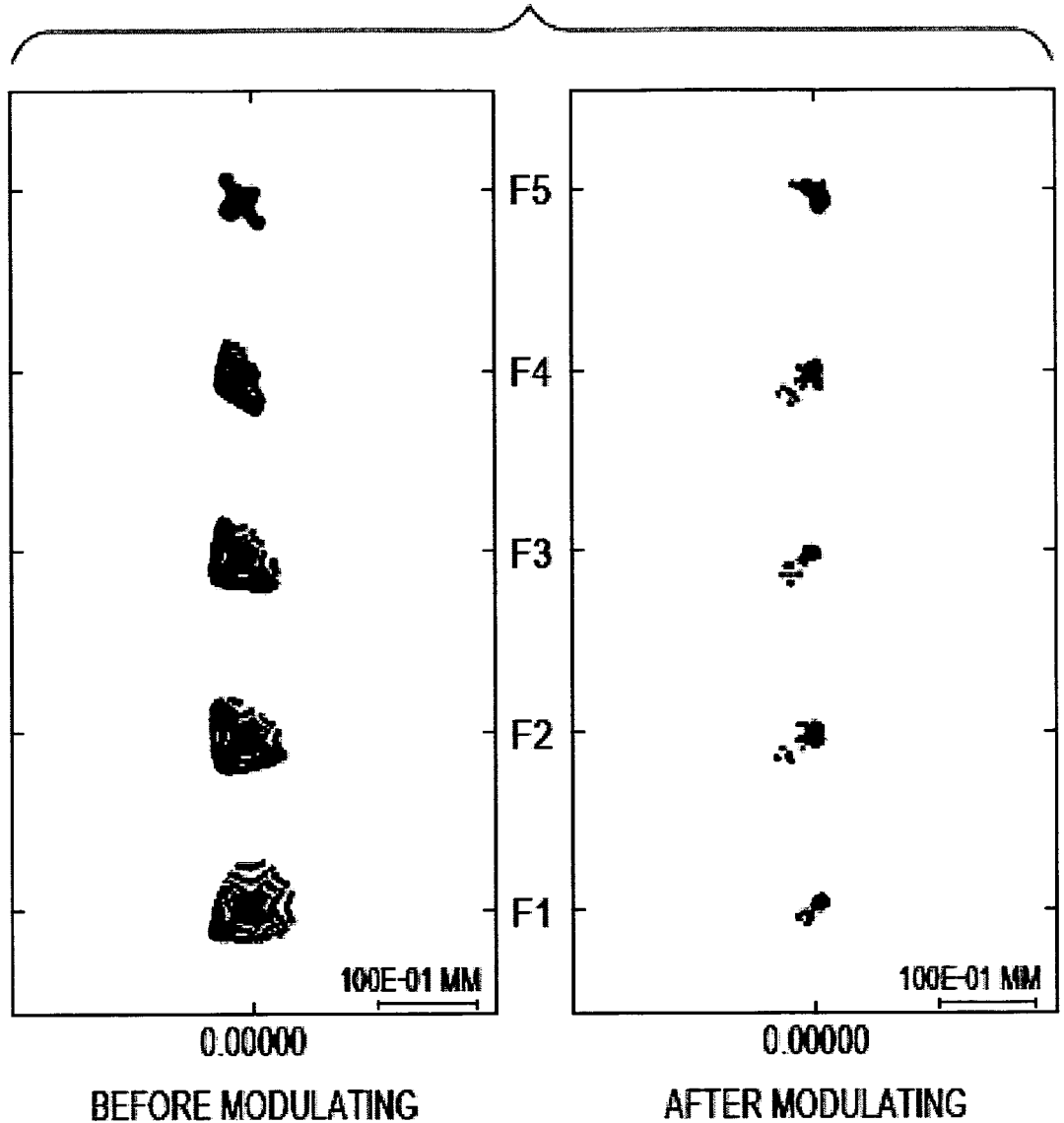
FIG. 23 is a diagram illustrating spots of an area d1 (wide side) obtained before and after the phase modulating element performs the modulation according to the third embodiment.
Figure 24:
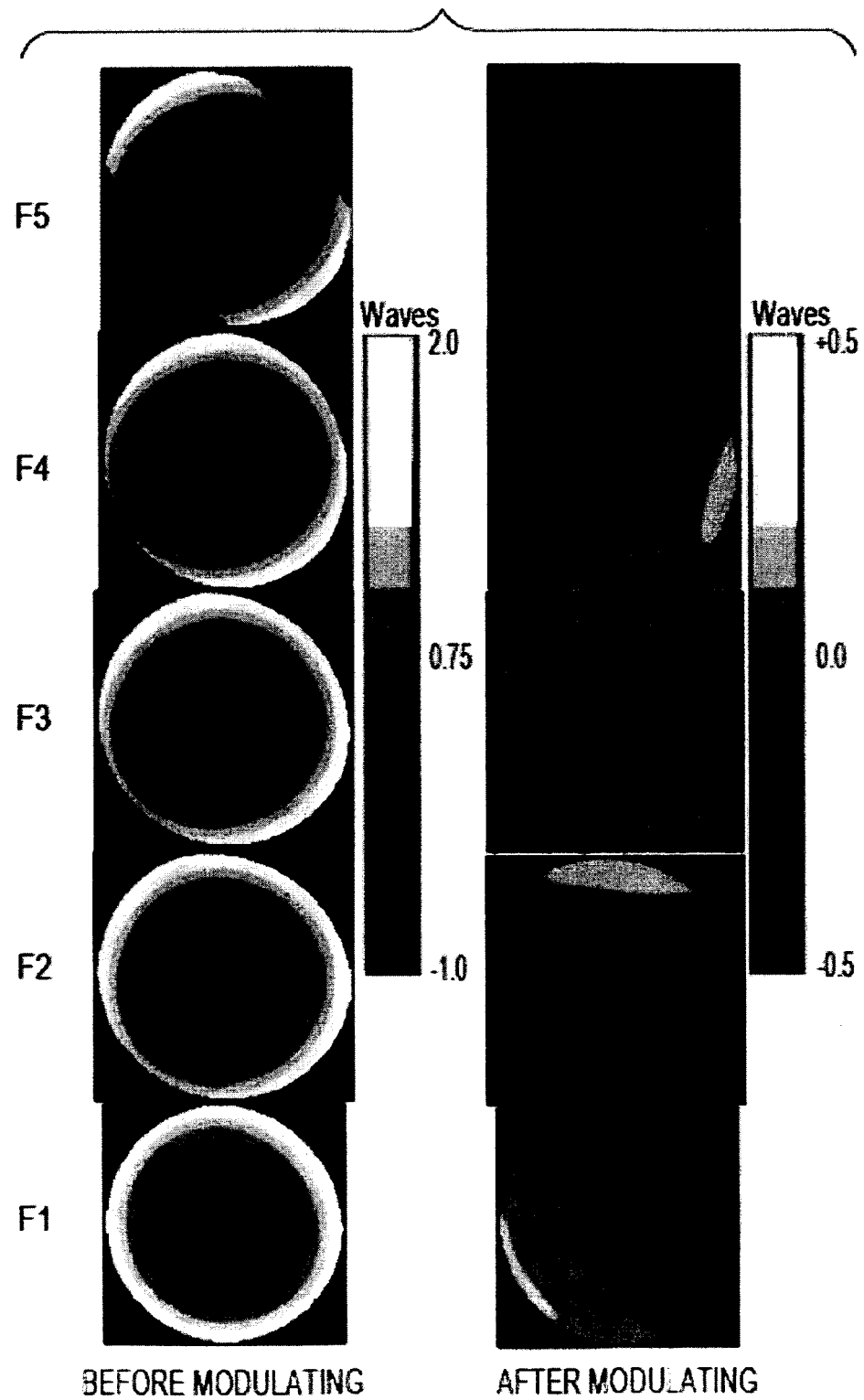
FIG. 24 is a diagram illustrating wavefront aberrations of the area d1 (wide side) obtained before and after the phase modulating element performs the modulation according to the third embodiment.
Figure 25:
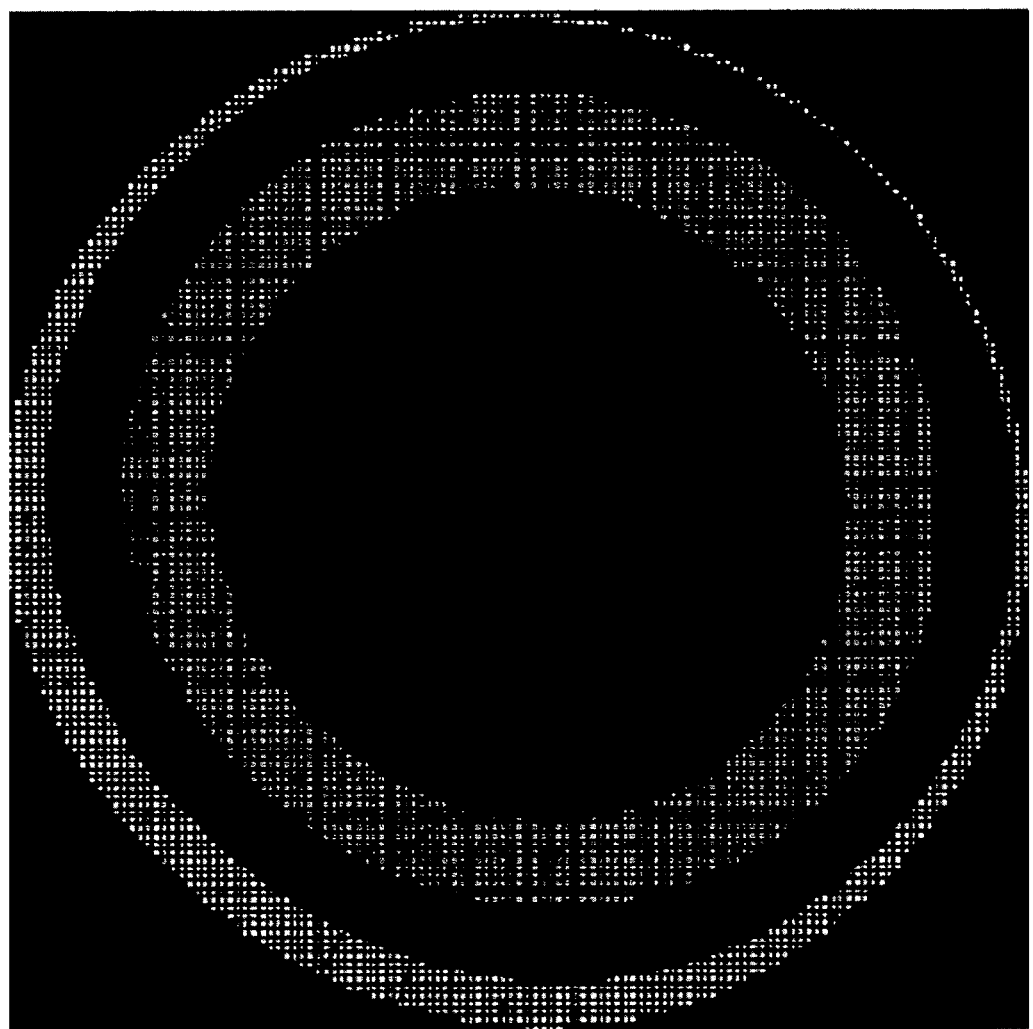
FIG. 25 is a diagram illustrating phase modulating amounts provided to the phase modulating element with regard to the area d1 (wide side) according to the third embodiment.
Figure 26:
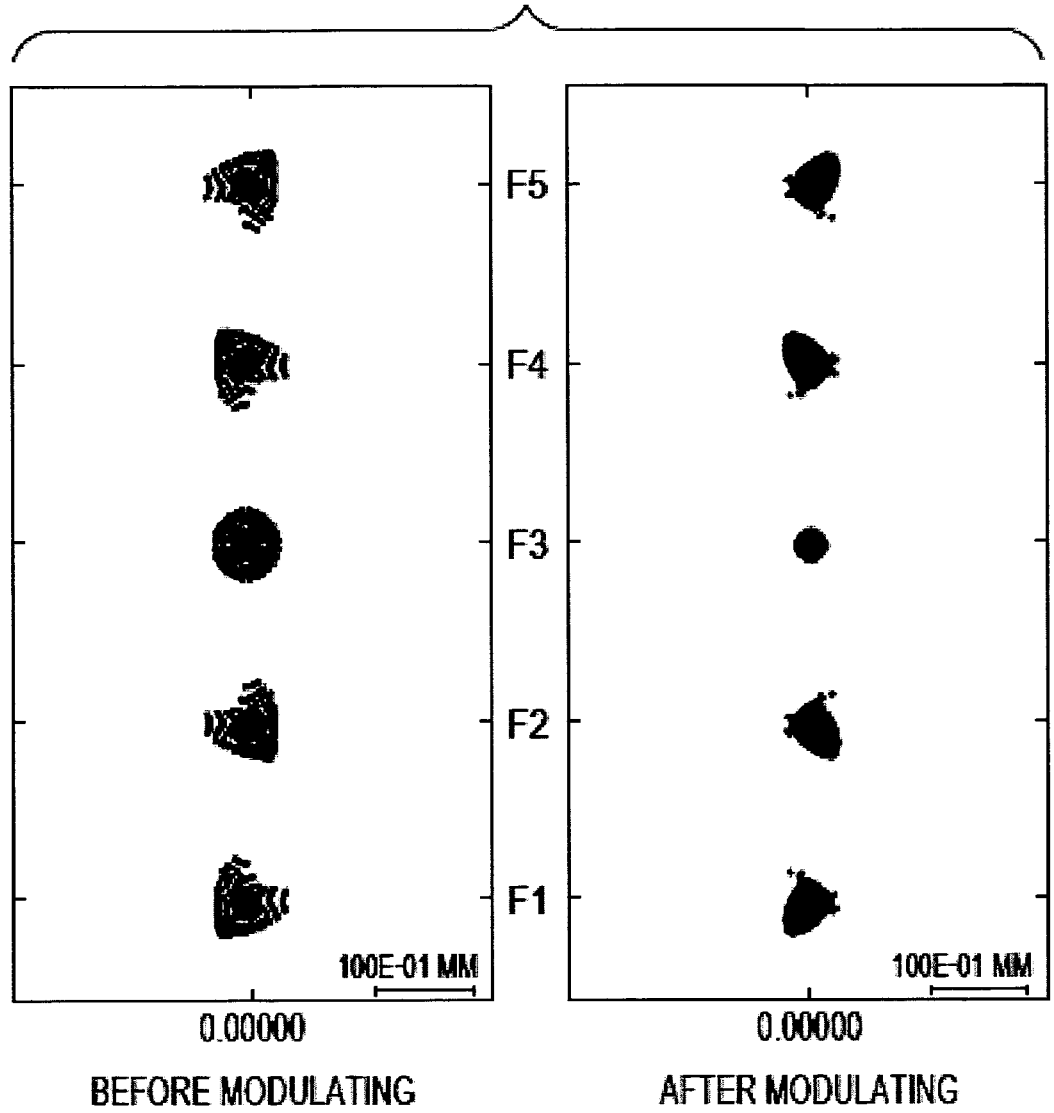
FIG. 26 is a diagram illustrating spots of an area a (wide side) obtained before and after the phase modulating element performs the modulation according to the third embodiment.
Figure 27:
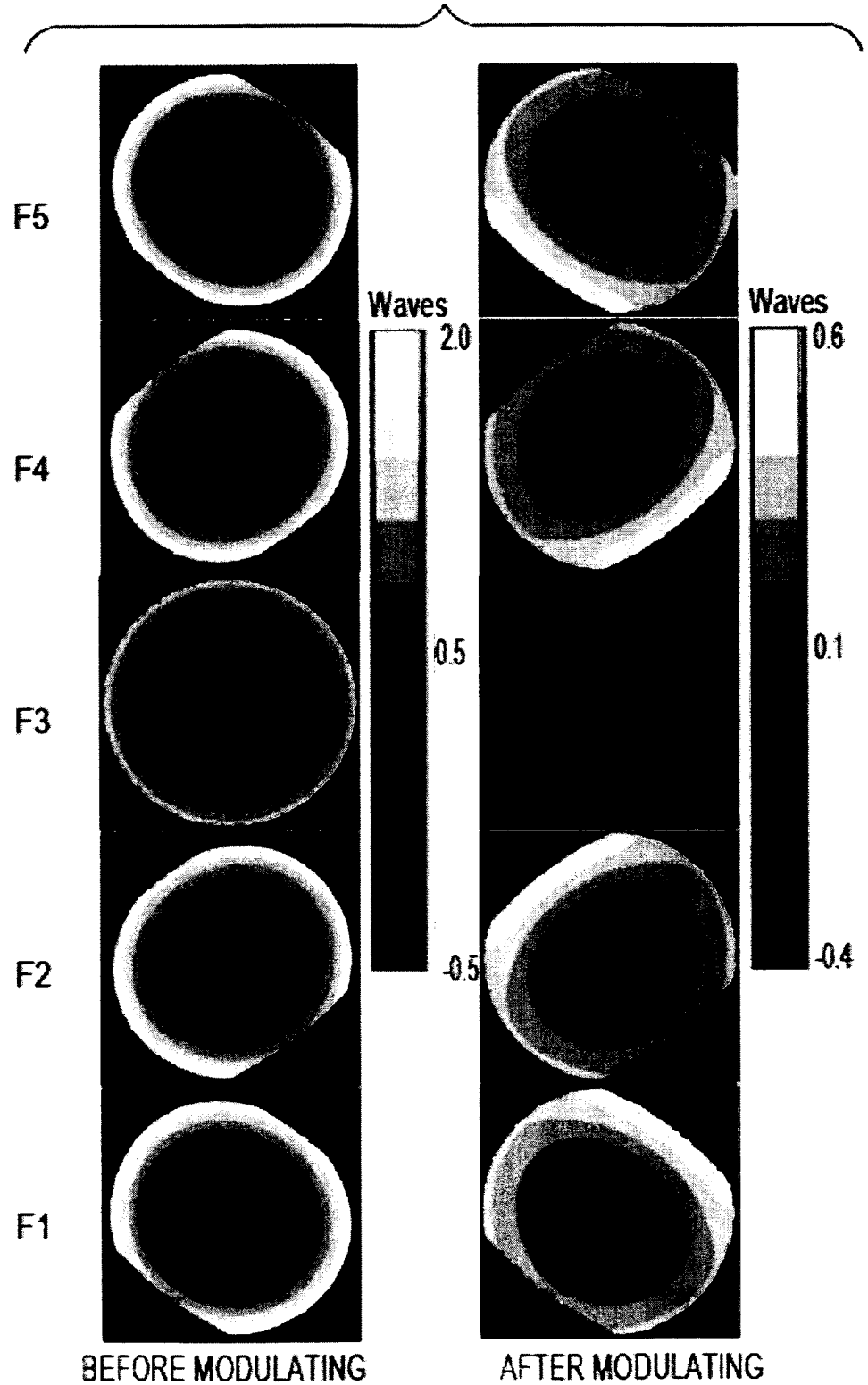
FIG. 27 is a diagram illustrating wavefront aberrations of the area a (wide side) obtained before and after the phase modulating element performs the modulation according to the third embodiment.
Figure 28:
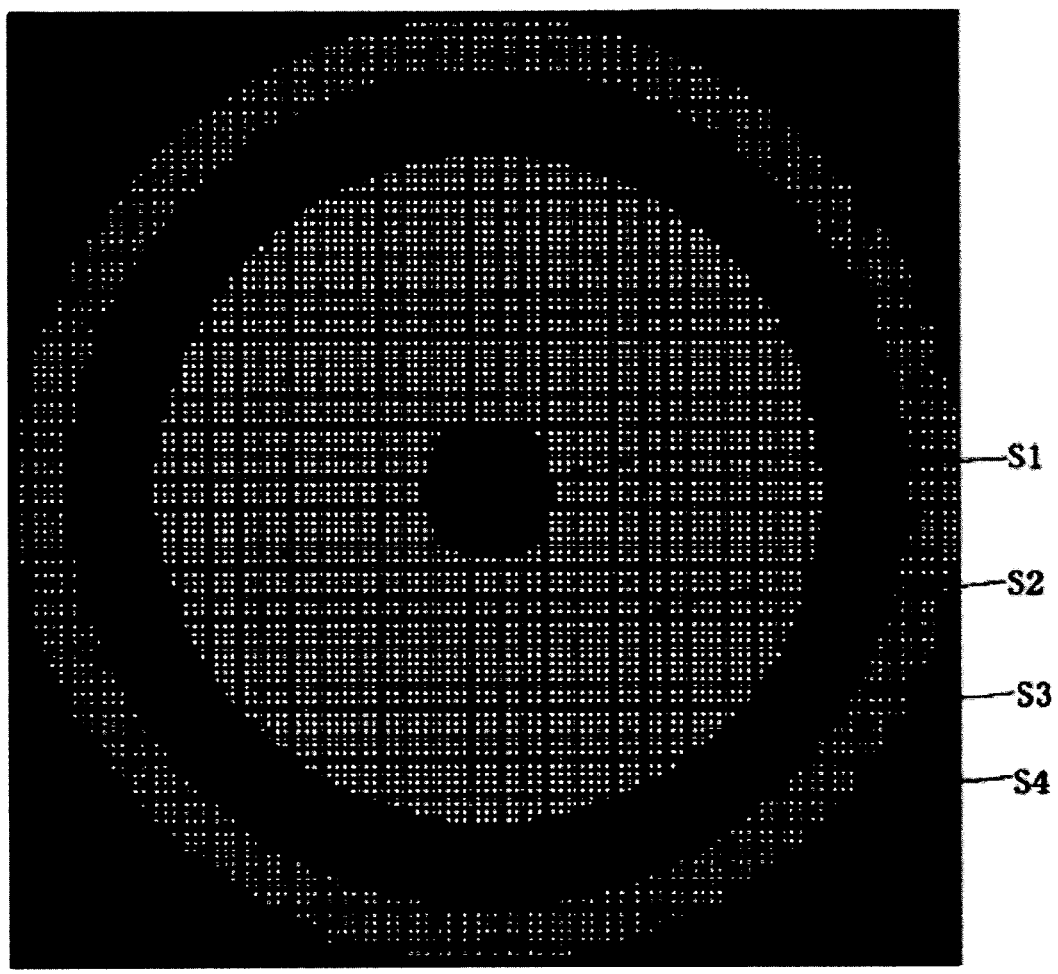
FIG. 28 is a diagram illustrating phase modulating amounts provided to the phase modulating element with regard to the area a (wide side) according to the third embodiment.
Figure 29:
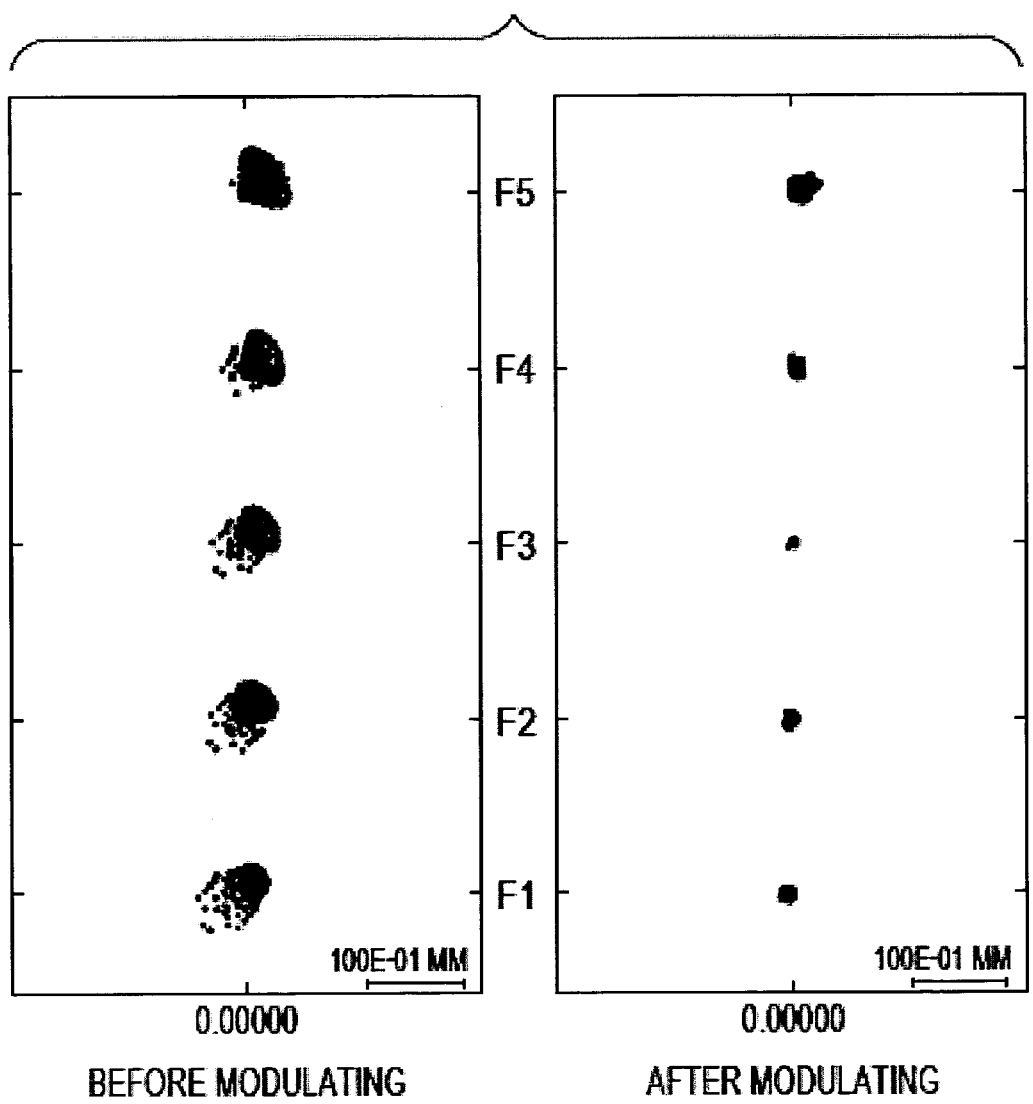
FIG. 29 is a diagram illustrating spots of an area d1' (telephoto side) obtained before and after the phase modulating element performs the modulation according to the third embodiment.
Figure 30:
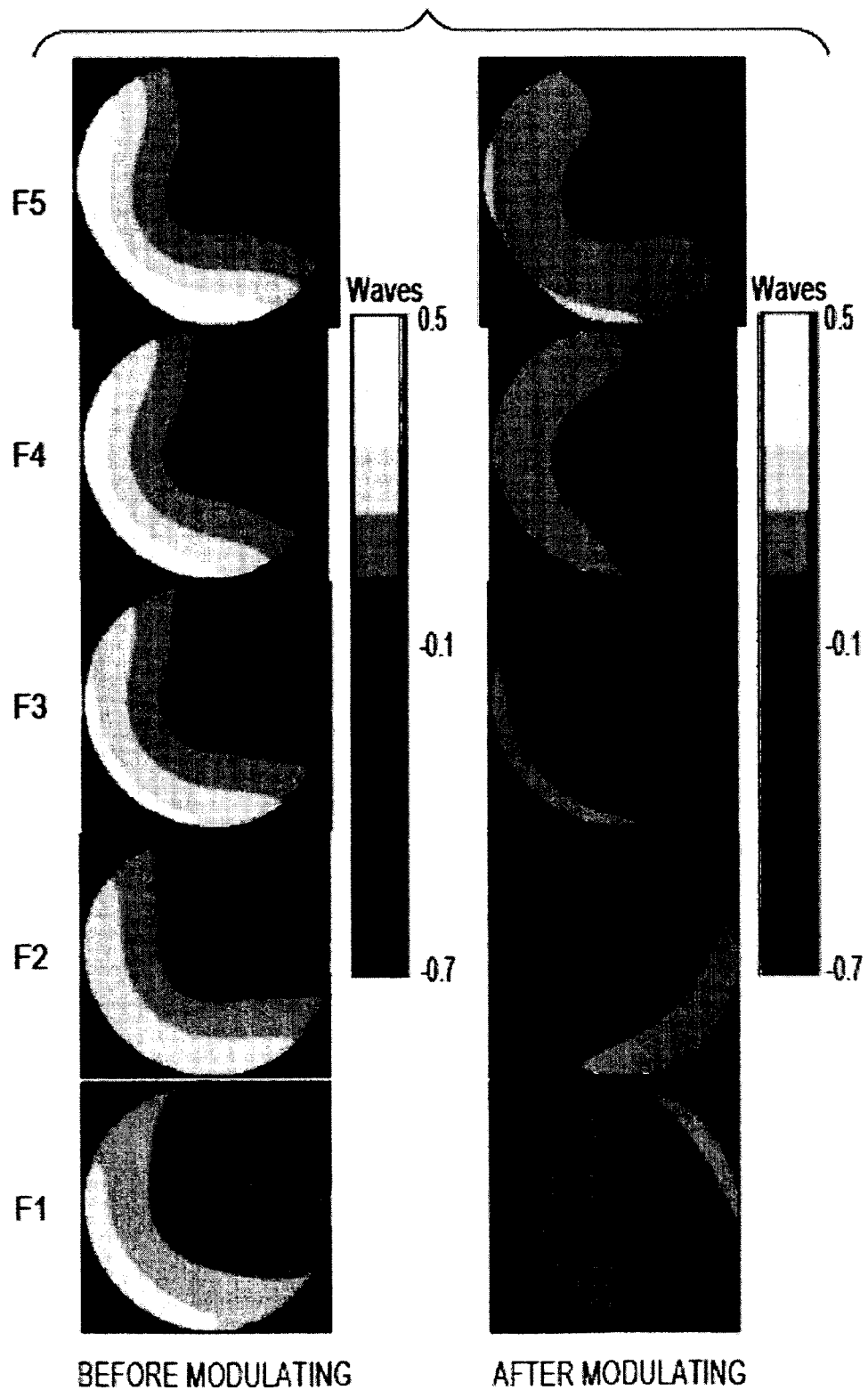
FIG. 30 is a diagram illustrating wavefront aberrations of the area d1' (telephoto side) obtained before and after the phase modulating element performs the modulation according to the third embodiment.
Figure 31:
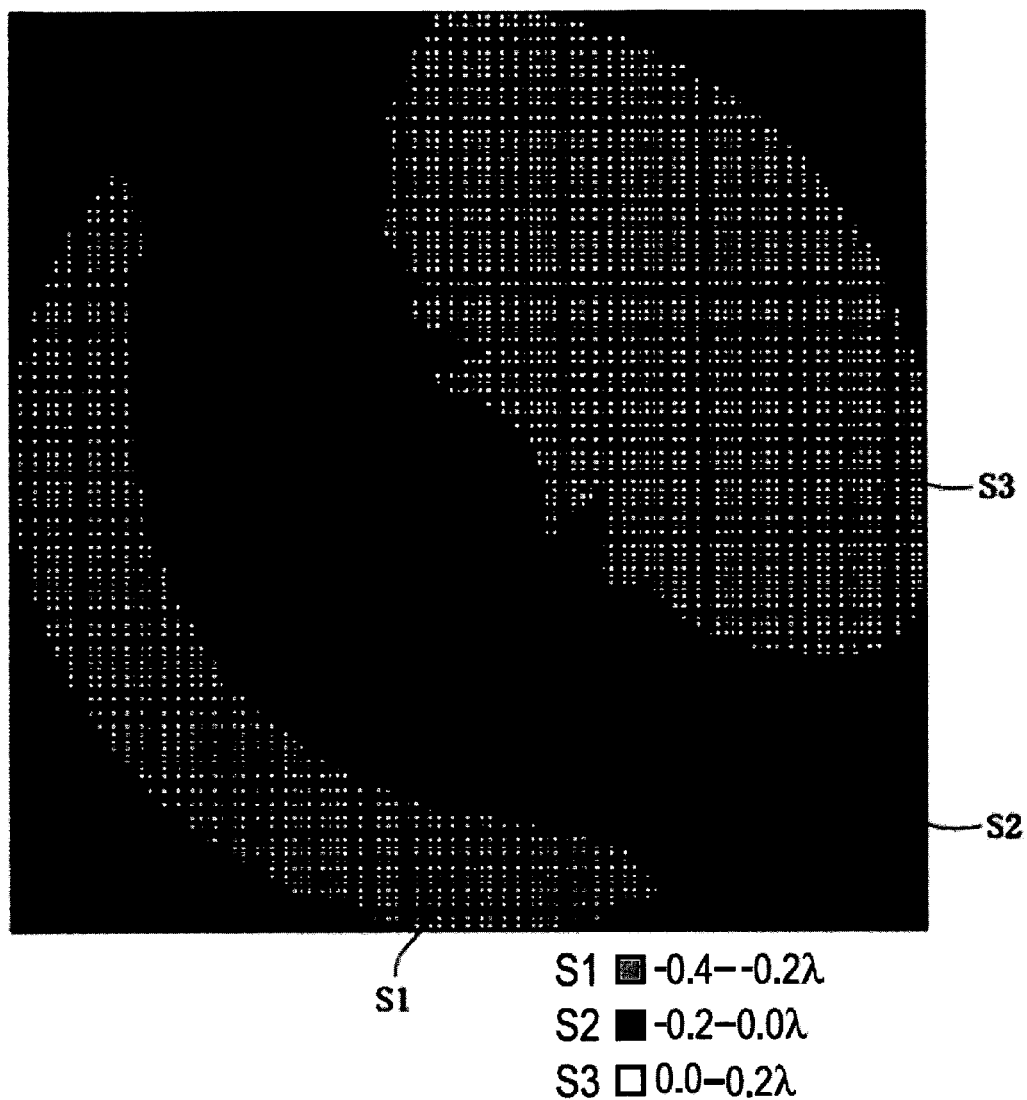
FIG. 31 is a diagram illustrating phase modulating amounts provided to the phase modulating element with regard to the area d1' (telephoto side) according to the third embodiment.
Figure 32:
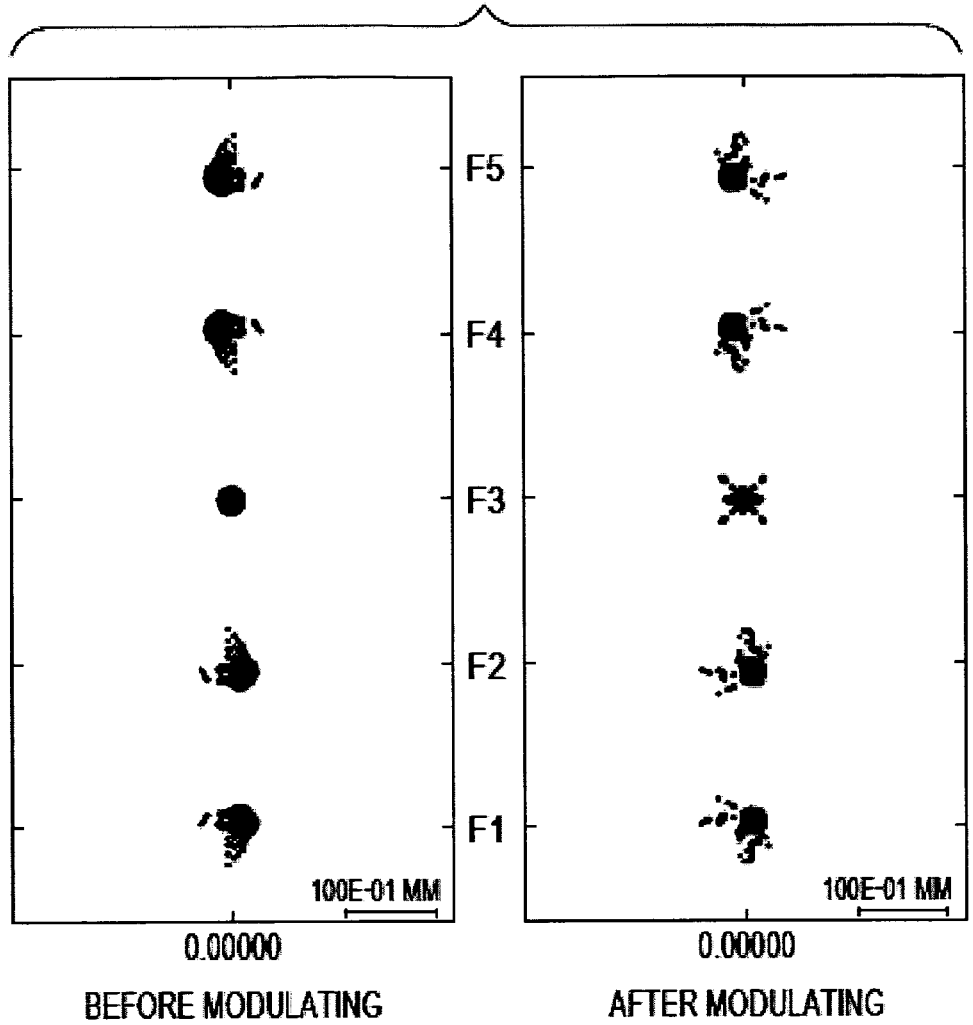
FIG. 32 is a diagram illustrating spots of an area a' (telephoto side) obtained before and after the phase modulating element performs the modulation according to the third embodiment.
Figure 33:
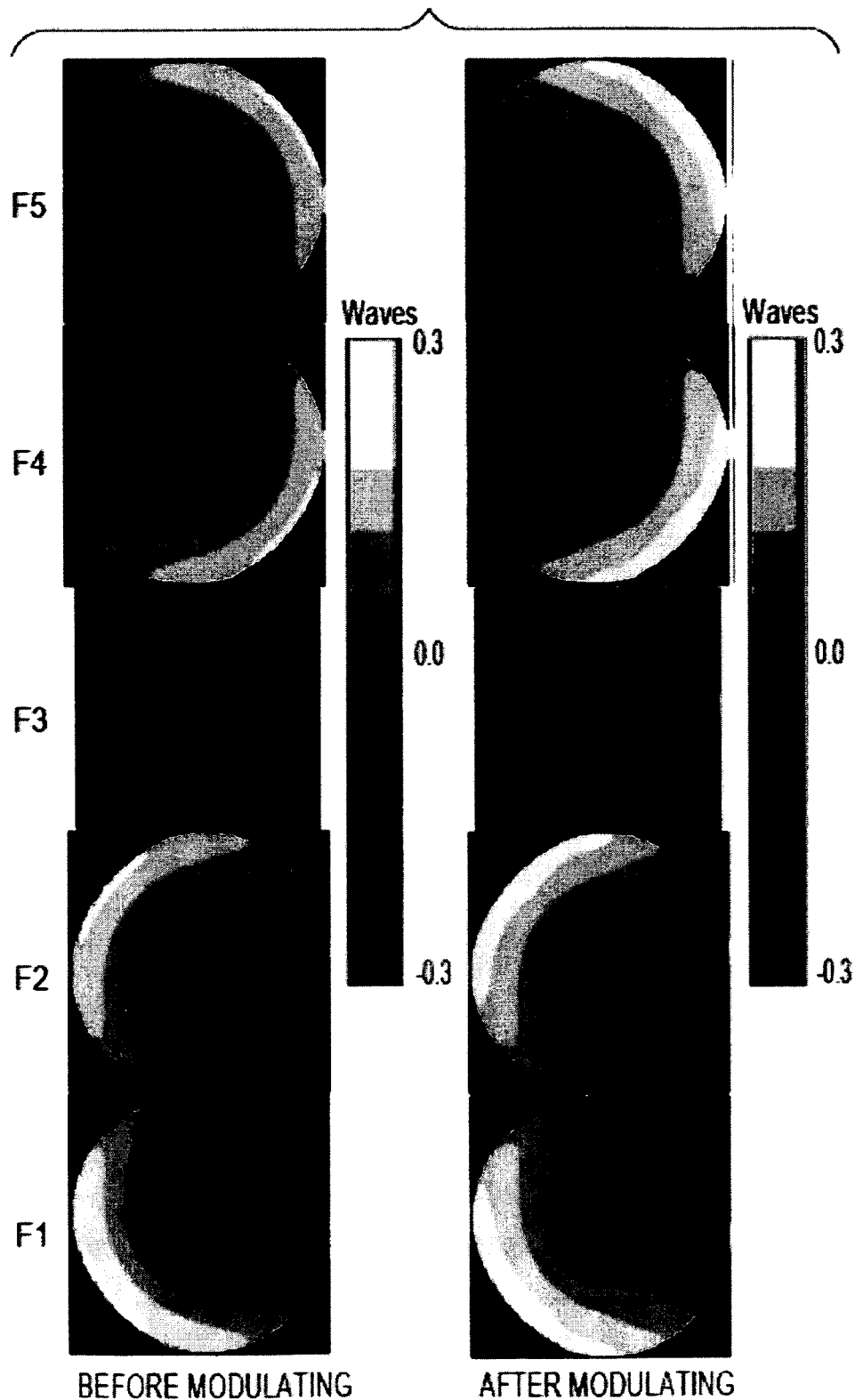
FIG. 33 is a diagram illustrating wavefront aberrations of the area a' (telephoto side) obtained before and after the phase modulating element performs the modulation according to the third embodiment.
Figure 34:
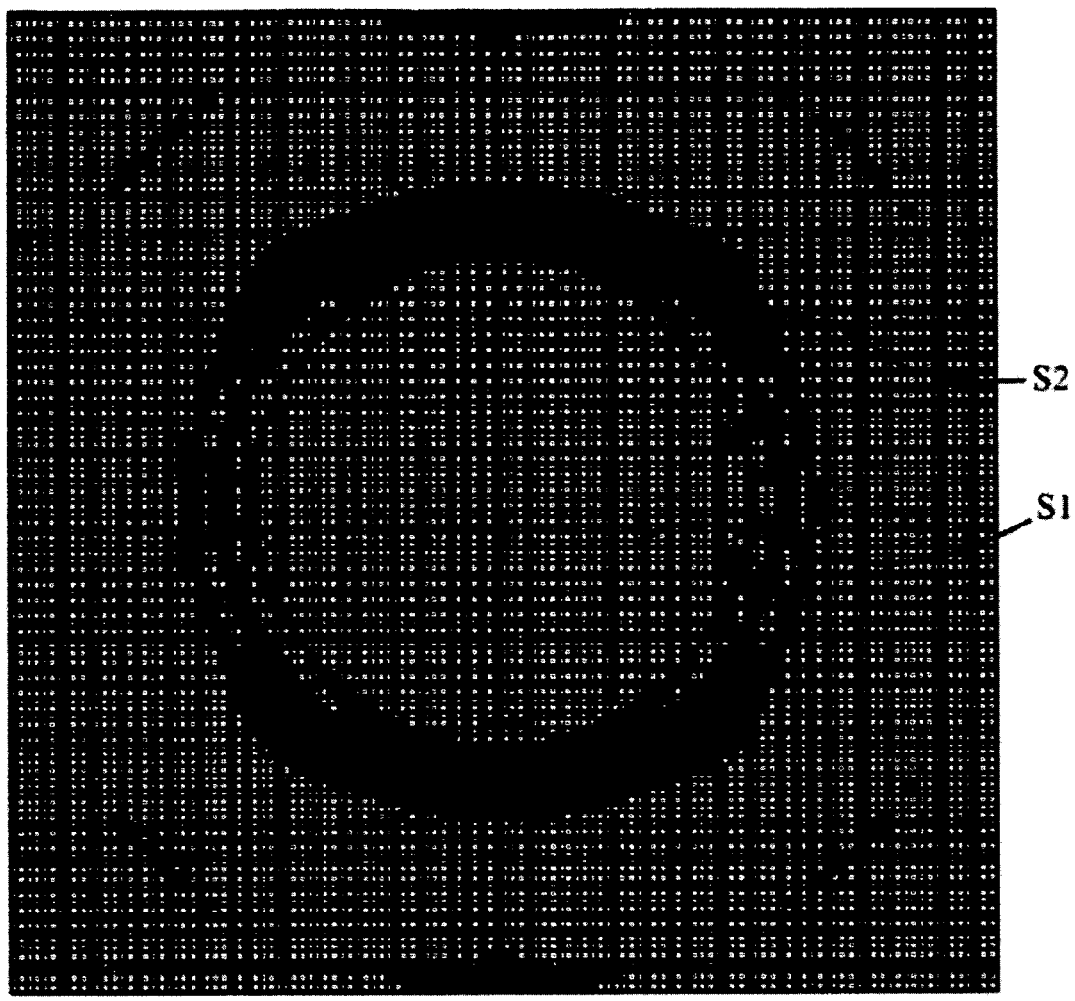
FIG. 34 is a diagram illustrating phase modulating amounts provided to the phase modulating element with regard to the area a' (telephoto side) according to the third embodiment.

FIGS. 20 to 22 respectively illustrate the spots, the wavefront aberrations and the phase modulating amounts of an area i1 in the case of the wide-angle end. FIGS. 23 to 25 respectively illustrate the spots, the wavefront aberrations and the phase modulating amounts of an area d1 in the case of the wide-angle end. FIGS. 26 to 28 respectively illustrate the spots, the wavefront aberrations and the phase modulating amounts of an area a in the case of the wide-angle end. FIGS. 29 to 31 respectively illustrate the spots, the wavefront aberrations and the phase modulating amounts of an area d1' in the case of the telephoto end. FIGS. 32 to 34 respectively illustrate the spots, the wavefront aberrations and the phase modulating amounts of an area a' in the case of the telephoto end.

Figure 35:
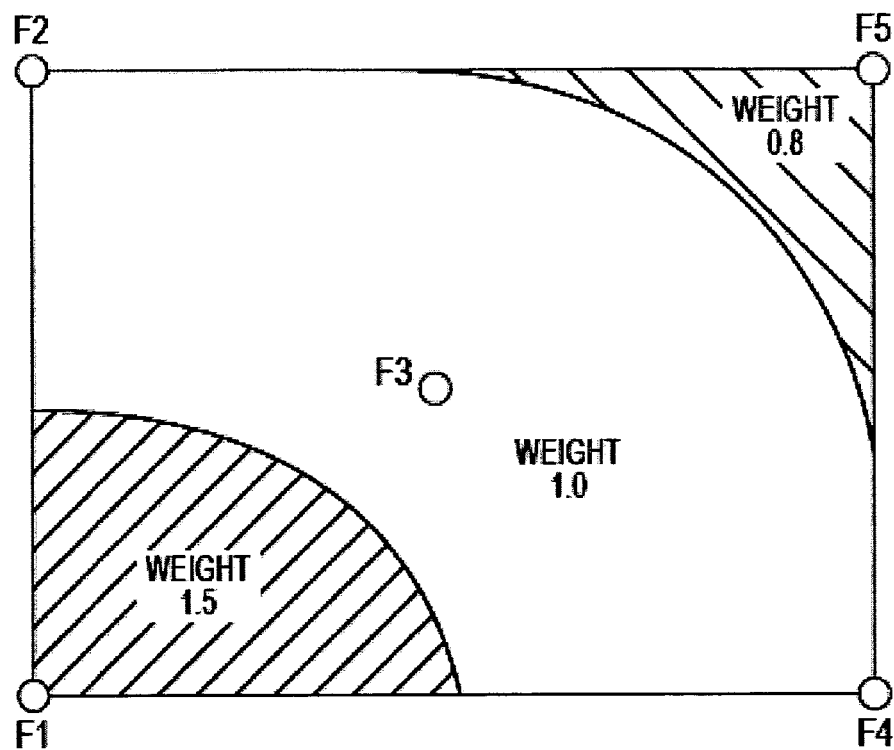
FIG. 35 is a diagram illustrating an example of weighting performed on respective points in an area according to the third embodiment.

Note that, in this embodiment, as in FIG. 35, weighting is performed on each position in the area of the image pickup element 102, thereby determining the phase modulating amount which is to be added to the phase modulating element 101. In this embodiment, the weighting function is determined in such a manner that the wavefront aberration closer to the center of the angle of field is corrected to a larger extent. By doing so, a more favorable image can be obtained at a position closer to the center of the screen. The weighting function is also stored in the LUT 104, and an appropriate weighting amount is applied according to the zoom position. The weighting function may differ depending on the area or depending on the zoom position.

Further, in this embodiment, the adopted divided areas differ only between the case of the wide-angle end and the case of the telephoto end. However, the division number may be further changed at respective zoom positions between the wide-angle end and the telephoto end, thereby enabling the most effective division number to be selected for each focal length. Further, the phase modulating amounts adopted in this embodiment are all premised on a case where the position of an object is at infinity. In a case where an object is positioned at a finite distance, phase modulating amounts optimal for respective positions of the object may be adopted.

TABLE 3

| | x-coordinate | y-coordinate | x angle of field (deg) | y angle of field (deg) |
|---|---|---|---|---|
| Area A | −0.40~0.40 | −0.40~0.40 | −11.280~11.280 | −8.508~8.508 |
| Area B | −0.40~0.40 | 0.40~0.71 | −11.280~11.280 | 8.508~14.957 |

TABLE 3-continued

|  | x-coordinate | y-coordinate | x angle of field (deg) | y angle of field (deg) |
|---|---|---|---|---|
| Area C | 0.40~0.71 | −0.40~0.40 | 11.280~19.605 | −8.508~8.508 |
| Area D | 0.40~0.71 | 0.40~0.71 | 11.280~19.605 | 8.508~14.957 |
| Area E | −0.40~0.40 | 0.71~1.00 | −11.280~11.280 | 14.957~20.552 |
| Area F | 0.40~0.71 | 0.71~1.00 | 11.280~19.605 | 14.957~20.552 |
| Area G | 0.71~1.00 | −0.40~0.40 | 19.605~26.560 | −8.508~8.508 |
| Area H | 0.71~1.00 | 0.40~0.71 | 19.605~26.560 | 8.508~14.957 |
| Area I | 0.71~1.00 | 0.71~1.00 | 19.605~26.560 | 14.957~20.552 |

TABLE 4

|  | x-coordinate | y-coordinate | x angle of field (deg) | y angle of field (deg) |
|---|---|---|---|---|
| Area A' | −0.67~0.67 | −0.67~0.67 | −6.415~6.415 | −4.820~4.820 |
| Area B' | −0.67~0.67 | 0.67~1.00 | −6.415~6.415 | 4.820~7.083 |
| Area C' | 0.67~1.00 | −0.67~0.67 | 6.415~9.407 | −4.820~4.820 |
| Area D' | 0.67~1.00 | 0.67~1.00 | 6.415~9.407 | 4.820~7.083 |

Figure 36:
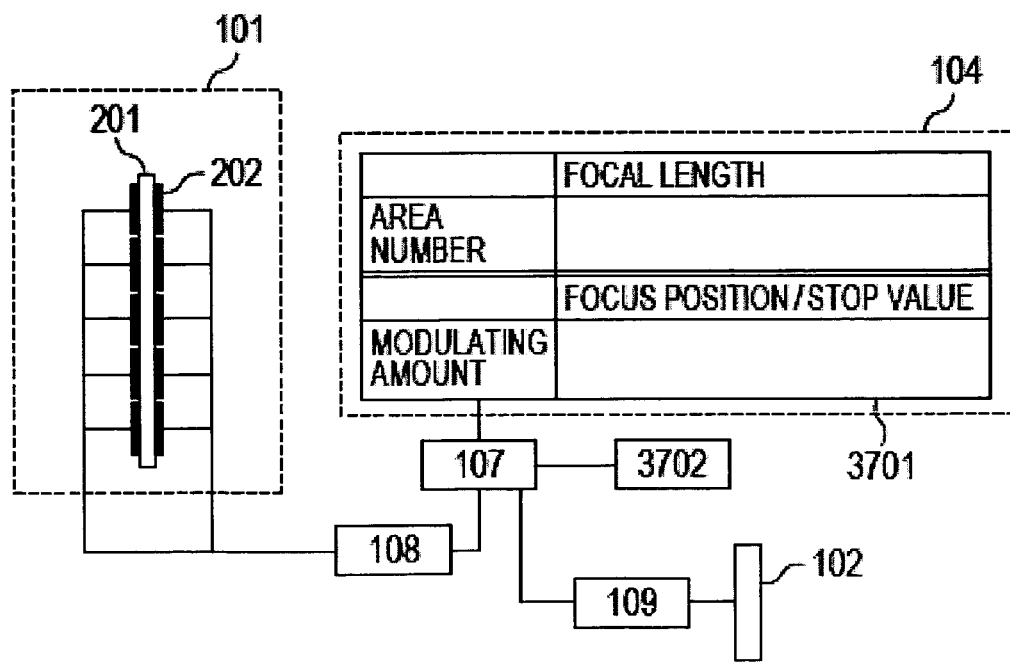
FIG. 36 is a diagram illustrating an example of a process in which data is read from an LUT and image pickup is then performed according to the third embodiment.

Here, referring to FIG. 36, described is a process up until image pickup, in which data is read from the LUT 104, and the phase modulating element 101 is caused to perform the modulation. The phase modulating element 101 used in FIG. 36 is a phase modulating element of liquid crystal type described in the first embodiment. As in FIG. 36, first, a current zoom position (focal length) of the zoom lens is obtained by a sensor 3702, and a table value indicating a focal length closest to the focal length stored in a memory 3701 is selected. Based on the selected table value, the number of divided areas on the image pickup element 102 is determined, and the determined value is then sent to the image pickup element controller 109. After that, the focus position and the stop value are detected by the sensor 3702 in the same manner, and a table value indicating a distance closest to the focus position stored in the memory 3701 is obtained, to thereby determine a phase modulating distribution which is to be provided to the phase modulating element 101.

Here, the sensor 3702 is denoted by the same reference symbol, but separate sensors may also be provided for detecting the zoom position, the focus position and the stop value, respectively. Based on the determined value, the control unit 107 calculates a voltage to be applied to transparent electrodes 202 of the phase modulating element 101. According to the determined voltage, the modulating element controller 108 applies the voltage to the transparent electrodes 202 to change the refractive index of the liquid crystal, thereby performing the phase modulation. In synchronization with the phase modulation, the image pickup element controller 109 controls the image pickup element 102 so as to perform the reading only for an area used for the image pickup. Though an area which is not used for the image pickup receives light, data is not read from this area. After the image pickup is finished with one area, charges accumulated in the image pickup element 102 are once reset, and the image pickup element controller 109 performs control so as to start the reading from the next area again. Through the process described above, the phase modulating element 101 can be caused to perform the modulation for each area on the image pickup element 102, and the acquisition of an image can be performed by synchronizing the phase modulation and the reading.

Fourth Embodiment

Figure 37:
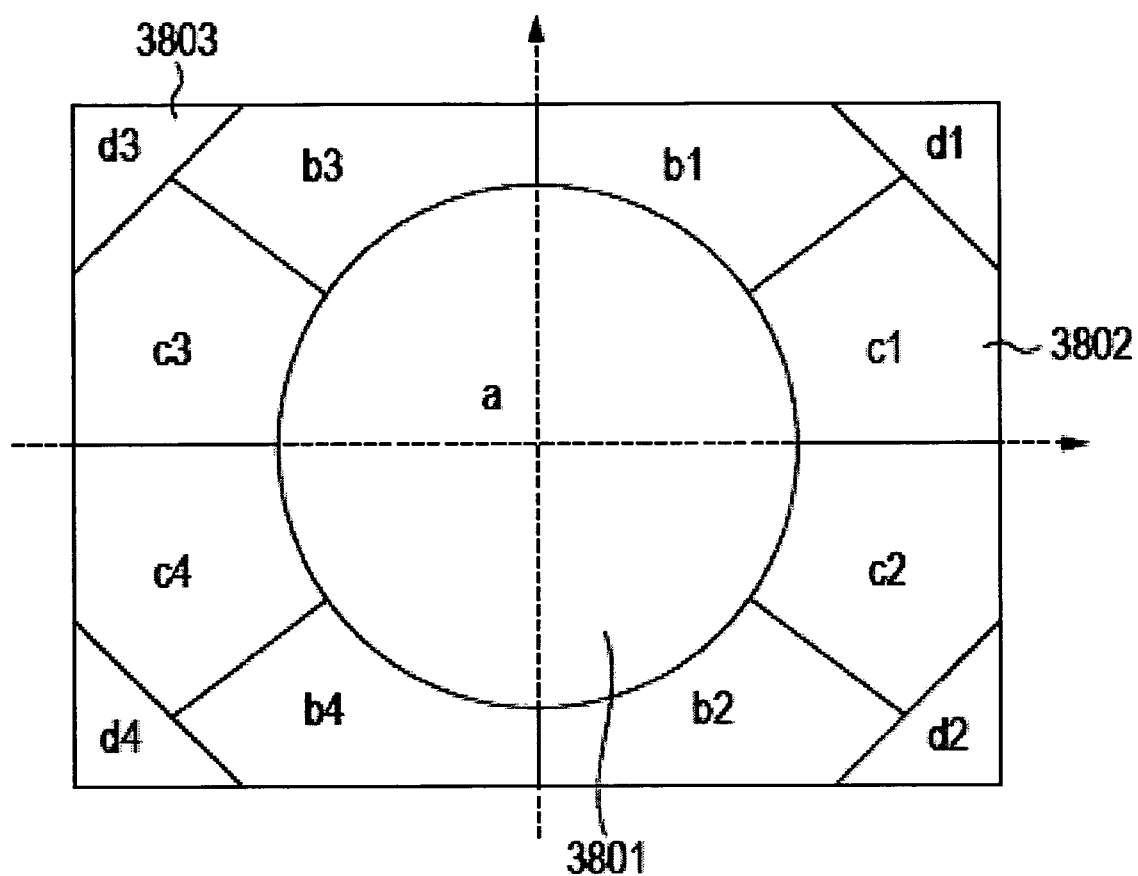
FIG. 37 is a diagram for describing a fourth embodiment of the present invention.

FIG. 37 is an explanatory diagram for area division performed on the surface of an image pickup element according to a fourth embodiment of the present invention. A division method for area division performed on an image pickup element 102 of the fourth embodiment is described. In the first to third embodiments, the shapes of the divided areas of the image pickup element 102 are all rectangular. However, the shape of the divided area is not limited thereto. For example, as illustrated in FIG. 37, the division may be made as follows. That is, a large circular area 3801 is set at the center where the optical performance is excellent, and, around the area 3801, areas 3802 are set radially. By performing the area division in this manner, with respect to a rotationally-symmetric optical system, differences in correcting amount among the areas can be reduced. Further, divided areas are further made smaller like divided areas 3803 on the periphery of the screen, and hence such an optical system can be handed with more ease that the wavefront aberration steeply increases on the periphery of the screen.

Further, though not described in the embodiments described above, for example, in the case of an image pickup optical system in which image bur cased by camera shaking is optically stabilized, part of the optical system may be made decentered for the image stabilizing. In such an optical system, decentering aberration occurs according to the decentering amount at the time of the image stabilizing for the camera shaking. With regard to the decentering aberration, too, similarly, an LUT can be created for the decentering amount and the decentering aberration, and the phase modulating element can be caused to perform modulation according to the decentering amount, thereby correcting the decentering aberration.

According to the embodiments described above, more favorable optical performance can be achieved by changing the correcting amount of the wavefront aberration according to the zoom position, the focus position and the like of the image pickup optical system, or changing the division number of areas of the image pickup element itself. Further, considering that the image pickup element is divided into areas, if a CMOS image pickup element, which is capable of reading on a pixel basis, is used, the present invention can favorably deal with image pickup performed in a time-sharing manner, a change in number of divided areas and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2010-094941 filed Apr. 16, 2010, which is hereby incorporated by reference herein in its entirety.

The invention claimed is:
1. An image pickup apparatus comprising:
an image pickup element;
an image pickup optical system configured to form an image of an object on the image pickup element using a beam from the object;

a phase modulating element disposed on a pupil plane of the image pickup optical system, and configured to modulate a phase state of the beam from the object;

a modulating element controller configured to control the phase modulation amount of the phase modulating element; and an image pickup element controller configured to divide an effective area of the image pickup element into multiple areas, and read information on each of the multiple divided areas sequentially, wherein, when the image pickup element controller reads the information on the multiple divided areas of the image formed on the image pickup element by area-by-area basis sequentially, the modulating element controller is configured to control the phase modulating element in accordance with timing of reading of the information of the respective divided areas to reduce a wavefront aberration in the divided area from which the information is to be read.

2. The image pickup apparatus according to claim 1, wherein:

a number of the multiple divided areas is at least three, and the image pickup apparatus performs picking up images at least as many times as the number of the multiple divided areas.

3. The image pickup apparatus according to claim 1, wherein an area containing a center of the image pickup element has a largest size in the multiple divided areas.

4. The image pickup apparatus according to claim 1, wherein the image pickup optical system has a zoom function, and a number of the multiple divided areas changes depending on a zoom position of the image pickup optical system.

5. The image pickup apparatus according to claim 4, wherein the number of the multiple divided areas is larger at a wide-angle end than at a telephoto end.

6. The image pickup apparatus according to claim 4, further comprising a lookup table for determining a phase amount, by which a passing beam is to be modulated by the phase modulating element, depending on one of the zoom position or a focus position of the image pickup optical system, and a position of the divided area among the multiple divided areas.

7. The image pickup apparatus according to claim 1, wherein the modulating element controller sets a phase amount, by which a passing beam is to be modulated by the phase modulating element, so as to minimize a wavefront aberration at a center of the divided area.

8. The image pickup apparatus according to claim 1, wherein the modulating element controller calculates an average value of wavefront aberrations in each of the multiple divided areas and sets a phase amount, which is to be provided to a passing beam at the phase modulating element, so as to minimize a wavefront aberration at a point in the divided area, the point having the same wavefront aberration value as the average value.

9. The image pickup apparatus according to claim 1, wherein the modulating element controller performs weighting on wavefront aberrations in the each of the multiple divided areas, and sets a phase amount, which is to be provided to a passing beam at the phase modulating element, so as to minimize a wavefront aberration at a point having a highest weight in the divided area.

10. The image pickup apparatus according to claim 1, wherein the image pickup element comprises a CMOS image pickup element.

11. The image pickup apparatus according to claim 1, wherein the image pickup element controller is configured to control the phase modulating element to reduce the wavefront aberration in the divided area from which the information is to be read, then to accumulate charges in the image pickup element in the divided area, and then to read the accumulated charges sequentially.

12. The image pickup apparatus according to claim 1, wherein each of the multiple divided areas corresponds to a plurality of pixels of the image pickup element.

* * * * *